(12) United States Patent
Huang et al.

(10) Patent No.: US 8,189,272 B1
(45) Date of Patent: May 29, 2012

(54) OPTICAL LENS ASSEMBLY FOR IMAGE TAKING

(75) Inventors: Hsin-Hsuan Huang, Taichung (TW); Tsung-Han Tsai, Taichung (TW)

(73) Assignee: Largan Precision Co., Taichung (TW)

( * ) Notice: Subject to any disclaimer, the term of this patent is extended or adjusted under 35 U.S.C. 154(b) by 0 days.

(21) Appl. No.: 13/182,932

(22) Filed: Jul. 14, 2011

(30) Foreign Application Priority Data

Dec. 3, 2010 (TW) ................. 99142253 A

(51) Int. Cl.
*G02B 3/02* (2006.01)
*G02B 9/34* (2006.01)

(52) U.S. Cl. ........ 359/715; 359/771; 359/772; 359/779; 359/781

(58) Field of Classification Search .................. 359/715, 359/771, 772, 779, 781
See application file for complete search history.

(56) References Cited

U.S. PATENT DOCUMENTS

| | | | |
|---|---|---|---|
| 7,215,492 | B2 | 5/2007 | Sato et al. |
| 7,321,474 | B1 | 1/2008 | Jo |
| 2007/0014033 | A1 | 1/2007 | Shinohara |
| 2007/0058256 | A1 | 3/2007 | Sun |
| 2007/0070234 | A1 | 3/2007 | Sun |
| 2007/0242370 | A1 | 10/2007 | Fukuta et al. |
| 2008/0024882 | A1 | 1/2008 | Park et al. |
| 2008/0043346 | A1 | 2/2008 | Sano |

FOREIGN PATENT DOCUMENTS

| | | |
|---|---|---|
| CN | 1815287 A | 8/2006 |
| EP | 1821129 A1 | 8/2007 |
| JP | 2004061938 A | 2/2004 |
| JP | 2004233654 A | 8/2004 |
| JP | 2004361934 A | 12/2004 |
| JP | 2005025174 A | 1/2005 |
| JP | 2005091666 A | 4/2005 |
| JP | 2007157031 A | 6/2007 |
| JP | 2007193195 A | 8/2007 |
| JP | 2007219520 A | 8/2007 |
| JP | 2007225833 A | 9/2007 |
| JP | 2007286153 A | 11/2007 |
| JP | 2008020893 A | 1/2008 |
| TW | M314860 | 7/2007 |
| TW | 201024789 | 7/2010 |

*Primary Examiner* — Jack Dinh
(74) *Attorney, Agent, or Firm* — Wang Law Firm, Inc.

(57) ABSTRACT

An optical lens assembly for image taking, sequentially from an object side to an image side along an optical axis comprises: the first lens element with refractive power, a bi-convex second lens element with positive refractive power, the third lens element with negative refractive power having a concave object-side surface and a convex image-side surface, the fourth lens element with positive refractive power having a convex object-side surface and a concave image-side surface. All four lenses may be made of plastic with bi-aspherical surfaces. Additionally, the optical lens assembly for image taking satisfies conditions to shorten the total length and reduce the sensitivity in order to achieve the goal of a fine aberration correction and ready for its use in cameras and camera mobile phones.

23 Claims, 28 Drawing Sheets

TABLE 1

(Embodiment 1)

f = 2.94 mm, Fno = 2.30, HFOV = 33.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | -8.02020 (ASP) | 0.979 | Plastic | 1.530 | 55.8 | -47.29 |
| 2 | | -12.29380 (ASP) | 0.148 | | | | |
| 3 | Ape. Stop | Plano | 0.066 | | | | |
| 4 | Lens 2 | 1.63982 (ASP) | 1.141 | Plastic | 1.530 | 55.8 | 2.16 |
| 5 | | -2.85856 (ASP) | 0.318 | | | | |
| 6 | Lens 3 | -0.92302 (ASP) | 0.483 | Plastic | 1.633 | 23.4 | -3.32 |
| 7 | | -1.98063 (ASP) | 0.205 | | | | |
| 8 | Lens 4 | 1.46904 (ASP) | 1.001 | Plastic | 1.543 | 56.5 | 9.26 |
| 9 | | 1.57706 (ASP) | 0.400 | | | | |
| 10 | IR-filter | Plano | 0.600 | Glass | 1.517 | 64.2 | - |
| 11 | | Plano | 0.145 | | | | |
| 12 | Image | Plano | - | | | | |

Reference wavelength is 587.6 nm. ASP stands for aspherical surfaces.

FIG. 8

TABLE 2
Aspheric Coefficients

| Surface # | 1 | 2 | 4 | 5 |
|---|---|---|---|---|
| k = | 3.53334E+01 | 1.93916E+02 | −4.16442E+00 | 3.76724E+00 |
| A4 = | 1.73558E-03 | −8.70282E-02 | −3.33697E-02 | −1.19990E-01 |
| A6 = | 3.74866E-03 | 3.26640E-02 | −5.57279E-02 | −2.95378E-01 |
| A8 = | −2.05365E-03 | 6.39665E-02 | −1.88383E-02 | 2.42642E-01 |
| A10 = | −3.71154E-03 | −5.51254E-02 | −3.87286E-01 | 8.95499E-02 |
| A12 = | 8.56967E-04 | −2.50536E-01 | 7.33936E-01 | −1.74865E-01 |
| A14 = | 4.96546E-04 | 3.34826E-01 | −8.47005E-01 | 3.48641E-02 |

| Surface # | 6 | 7 | 8 | 9 |
|---|---|---|---|---|
| k = | −4.75698E+00 | 1.31197E+00 | −9.00002E+00 | −1.66774E+00 |
| A4 = | −3.33076E-01 | −3.02857E-02 | −1.38540E-01 | −1.69867E-01 |
| A6 = | 2.44577E-01 | 2.44465E-01 | 7.05033E-03 | 7.07477E-02 |
| A8 = | 1.61290E-01 | 7.10490E-02 | 1.03130E-01 | −1.95172E-02 |
| A10 = | −7.56786E-02 | −2.95396E-02 | −1.15899E-01 | 2.16756E-03 |
| A12 = | −1.58944E-01 | −8.11593E-02 | 5.94479E-02 | 1.78300E-04 |
| A14 = | 1.03126E-01 | 4.28250E-02 | −1.30560E-02 | −8.59260E-05 |

FIG. 9

TABLE 3

(Embodiment 2)

f = 2.91 mm, Fno = 2.30, HFOV = 32.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 10.78310 (ASP) | 0.235 | Plastic | 1.543 | 56.5 | 59.50 |
| 2 | | 16.05440 (ASP) | 0.100 | | | | |
| 3 | Ape. Stop | Plano | 0.117 | | | | |
| 4 | Lens 2 | 1.60866 (ASP) | 0.650 | Plastic | 1.543 | 56.5 | 2.03 |
| 5 | | -3.02070 (ASP) | 0.342 | | | | |
| 6 | Lens 3 | -0.85615 (ASP) | 0.575 | Plastic | 1.634 | 23.8 | -5.06 |
| 7 | | -1.47203 (ASP) | 0.280 | | | | |
| 8 | Lens 4 | 1.34257 (ASP) | 0.502 | Plastic | 1.543 | 56.5 | 79.79 |
| 9 | | 1.20308 (ASP) | 0.383 | | | | |
| 10 | IR-filter | Plano | 0.600 | Glass | 1.517 | 64.2 | - |
| 11 | | Plano | 0.419 | | | | |
| 12 | Image | Plano | - | | | | |

Reference wavelength is 587.6 nm. ASP stands for aspherical surfaces.

FIG. 10

TABLE 4
Aspheric Coefficients

| Surface # | 1 | 2 | 4 | 5 |
|---|---|---|---|---|
| k = | -1.37058E+02 | -2.90294E+01 | -4.51212E+00 | 8.02849E+00 |
| A4 = | -1.35777E-01 | -2.72066E-01 | -5.64053E-02 | -1.37838E-01 |
| A6 = | -6.33084E-02 | -4.51302E-03 | -1.87085E-01 | -2.64629E-01 |
| A8 = | -1.89067E-02 | -3.38318E-03 | -1.10493E-01 | 1.03380E-01 |
| A10 = | -3.96543E-02 | -3.02994E-02 | -3.87787E-01 | 1.25026E-01 |
| A12 = | -6.84078E-02 | -1.70597E-01 | 3.50806E-01 | 5.50210E-02 |
| A14 = | 2.80725E-02 | 2.08730E-01 | -8.49993E-01 | -2.83396E-01 |

| Surface # | 6 | 7 | 8 | 9 |
|---|---|---|---|---|
| k = | -2.73731E+00 | -8.47836E-01 | -6.52818E+00 | -2.10636E+00 |
| A4 = | -2.03728E-01 | 2.88117E-02 | -1.27784E-01 | -2.52582E-01 |
| A6 = | 3.90013E-01 | 3.03864E-01 | -5.85590E-02 | 1.29995E-01 |
| A8 = | 1.68079E-01 | 3.37188E-02 | 1.55508E-01 | -4.00818E-02 |
| A10 = | -1.56383E-01 | -1.08473E-02 | -1.22291E-01 | 8.81716E-04 |
| A12 = | -1.87227E-01 | -3.53545E-02 | 4.40998E-02 | 2.42446E-03 |
| A14 = | 1.39965E-01 | -9.44377E-03 | -5.95886E-03 | -4.94271E-04 |

FIG. 11

TABLE 5

(Embodiment 3)

f = 2.28 mm, Fno = 2.30, HFOV = 41.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | -3.95190 (ASP) | 0.900 | Plastic | 1.543 | 56.5 | -11.54 |
| 2 | | -11.54970 (ASP) | 0.131 | | | | |
| 3 | Ape. Stop | Plano | 0.115 | | | | |
| 4 | Lens 2 | 1.46170 (ASP) | 0.994 | Plastic | 1.543 | 56.5 | 1.78 |
| 5 | | -2.16742 (ASP) | 0.449 | | | | |
| 6 | Lens 3 | -0.50651 (ASP) | 0.350 | Plastic | 1.633 | 23.4 | -3.03 |
| 7 | | -0.87279 (ASP) | 0.050 | | | | |
| 8 | Lens 4 | 1.03146 (ASP) | 0.625 | Plastic | 1.543 | 56.5 | 4.57 |
| 9 | | 1.38798 (ASP) | 0.350 | | | | |
| 10 | IR-filter | Plano | 0.600 | Glass | 1.517 | 64.2 | - |
| 11 | | Plano | 0.264 | | | | |
| 12 | Image | Plano | - | | | | |

Reference wavelength is 587.6 nm. ASP stands for aspherical surfaces.

FIG. 12

TABLE 6
Aspheric Coefficients

| Surface # | 1 | 2 | 4 | 5 |
|---|---|---|---|---|
| k = | 1.15674E+01 | 1.01956E+02 | -3.92076E+00 | 3.49760E+00 |
| A4 = | 1.62120E-02 | -1.48416E-01 | -6.79117E-02 | -1.18724E-01 |
| A6 = | 1.12144E-02 | 1.99288E-01 | -1.24406E-01 | -3.29141E-01 |
| A8 = | 1.43449E-02 | -3.52796E-01 | 8.06108E-02 | 2.33444E-01 |
| A10 = | -1.13486E-02 | 2.90621E-01 | -1.00829E+00 | 1.43517E-01 |
| A12 = | -1.19256E-02 | -1.79329E-01 | 5.14866E-01 | -1.83454E-01 |
| A14 = | 1.86561E-02 | 3.74742E-01 | -5.45615E-01 | -6.86623E-03 |

| Surface # | 6 | 7 | 8 | 9 |
|---|---|---|---|---|
| k = | -2.73462E+00 | -2.01884E+00 | -6.93860E+00 | -6.78643E+00 |
| A4 = | -2.83669E-01 | 9.44438E-02 | -9.31654E-02 | -1.26172E-01 |
| A6 = | 3.16209E-01 | 2.09970E-01 | -7.24673E-03 | 7.70338E-02 |
| A8 = | 1.91897E-01 | 6.62692E-02 | 8.20526E-02 | -3.65702E-02 |
| A10 = | -7.34229E-02 | -2.05233E-02 | -1.13674E-01 | 4.79892E-03 |
| A12 = | -1.63521E-01 | -7.63877E-02 | 6.80779E-02 | 2.47165E-03 |
| A14 = | 9.02317E-02 | 3.50551E-02 | -1.58092E-02 | -8.36230E-04 |

FIG. 13

TABLE 7

(Embodiment 4)

f = 3.23 mm, Fno = 2.40, HFOV = 30.0 deg.

| Surface | | Curvature Radius | Thickness | Material | Index | Abbe # | Focal length |
|---|---|---|---|---|---|---|---|
| 0 | Object | Plano | Infinity | | | | |
| 1 | Lens 1 | 18.87160 (ASP) | 0.719 | Plastic | 1.544 | 55.9 | -12.11 |
| 2 | | 4.81740 (ASP) | 0.167 | | | | |
| 3 | Ape. Stop | Plano | 0.053 | | | | |
| 4 | Lens 2 | 1.36282 (ASP) | 1.217 | Plastic | 1.544 | 55.9 | 1.95 |
| 5 | | -3.25730 (ASP) | 0.396 | | | | |
| 6 | Lens 3 | -0.76051 (ASP) | 0.517 | Plastic | 1.614 | 25.6 | -2.91 |
| 7 | | -1.66679 (ASP) | 0.050 | | | | |
| 8 | Lens 4 | 1.61642 (ASP) | 1.119 | Plastic | 1.543 | 56.5 | 7.30 |
| 9 | | 2.06363 (ASP) | 0.300 | | | | |
| 10 | IR-filter | Plano | 0.600 | Glass | 1.517 | 64.2 | - |
| 11 | | Plano | 0.255 | | | | |
| 12 | Image | Plano | - | | | | |

Reference wavelength is 587.6 nm. ASP stands for aspherical surfaces.

FIG. 14

TABLE 8
Aspheric Coefficients

| Surface # | 1 | 2 | 4 | 5 |
|---|---|---|---|---|
| k = | -1.24700E+02 | -1.00056E+02 | -4.46279E+00 | 4.54010E+00 |
| A4 = | -2.38065E-02 | -1.24614E-01 | -2.90884E-02 | -1.19251E-01 |
| A6 = | 7.07024E-03 | 2.33234E-02 | -6.47964E-02 | -2.80356E-01 |
| A8 = | 1.93625E-03 | 6.45576E-02 | 4.47997E-02 | 2.28737E-01 |
| A10 = | -1.06690E-02 | -4.05853E-02 | -3.48404E-01 | 7.75132E-02 |
| A12 = | -4.39901E-03 | -3.60373E-01 | 3.61462E-01 | -1.75040E-01 |
| A14 = | 5.04154E-03 | 4.07513E-01 | -3.75293E-01 | 5.17173E-02 |

| Surface # | 6 | 7 | 8 | 9 |
|---|---|---|---|---|
| k = | -3.96835E+00 | -1.26159E+00 | -1.51994E+01 | -8.11209E-01 |
| A4 = | -3.22858E-01 | -7.09902E-03 | -1.23998E-01 | -1.83339E-01 |
| A6 = | 2.52513E-01 | 2.28534E-01 | 1.68513E-02 | 6.81428E-02 |
| A8 = | 1.46264E-01 | 7.44540E-02 | 1.08762E-01 | -2.01994E-02 |
| A10 = | -1.02383E-01 | -2.89418E-02 | -1.17964E-01 | 2.57328E-03 |
| A12 = | -1.67240E-01 | -8.75120E-02 | 5.39823E-02 | 2.03807E-04 |
| A14 = | 1.29688E-01 | 3.66605E-02 | -1.01684E-02 | -1.12646E-04 |

FIG. 15

TABLE 9

(Embodiment 5)

f = 3.18 mm, Fno = 2.40, HFOV = 30.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | -50.00000 (ASP) | 0.790 | Plastic | 1.544 | 55.9 | -18.30 |
| 2 | | 12.50000 (ASP) | 0.149 | | | | |
| 3 | Ape. Stop | Plano | 0.107 | | | | |
| 4 | Lens 2 | 1.45613 (ASP) | 1.289 | Plastic | 1.544 | 55.9 | 2.07 |
| 5 | | -3.44570 (ASP) | 0.396 | | | | |
| 6 | Lens 3 | -0.75068 (ASP) | 0.484 | Plastic | 1.614 | 25.6 | -2.74 |
| 7 | | -1.68838 (ASP) | 0.050 | | | | |
| 8 | Lens 4 | 1.49312 (ASP) | 1.051 | Plastic | 1.543 | 56.5 | 6.07 |
| 9 | | 2.05185 (ASP) | 0.320 | | | | |
| 10 | IR-filter | Plano | 0.600 | Glass | 1.517 | 64.2 | - |
| 11 | | Plano | 0.236 | | | | |
| 12 | Image | Plano | - | | | | |

Reference wavelength is 587.6 nm. ASP stands for aspherical surfaces.

FIG. 16

TABLE 10
Aspheric Coefficients

| Surface # | 1 | 2 | 4 | 5 |
|---|---|---|---|---|
| k = | 1.55000E+02 | -9.32240E+01 | -3.97126E+00 | 3.82007E+00 |
| A4 = | -1.58848E-02 | -1.42881E-01 | -1.70227E-02 | -1.13798E-01 |
| A6 = | 3.62098E-04 | 6.79120E-02 | -5.06812E-02 | -2.77265E-01 |
| A8 = | 5.02438E-03 | 4.59988E-02 | 5.23251E-02 | 2.28677E-01 |
| A10 = | -8.04912E-03 | -5.22196E-02 | -3.26678E-01 | 7.41692E-02 |
| A12 = | -5.41209E-03 | -3.40733E-01 | 4.15272E-01 | -1.75752E-01 |
| A14 = | 5.41860E-03 | 4.10785E-01 | -3.75293E-01 | 5.72285E-02 |

| Surface # | 6 | 7 | 8 | 9 |
|---|---|---|---|---|
| k = | -4.20115E+00 | -1.48221E+00 | -1.34347E+01 | -8.78948E-01 |
| A4 = | -3.19480E-01 | -6.25352E-03 | -1.35325E-01 | -1.84065E-01 |
| A6 = | 2.47739E-01 | 2.21002E-01 | 1.55819E-02 | 6.83900E-02 |
| A8 = | 1.35236E-01 | 7.10774E-02 | 1.11271E-01 | -1.89561E-02 |
| A10 = | -1.08140E-01 | -2.49479E-02 | -1.19107E-01 | 2.13266E-03 |
| A12 = | -1.62271E-01 | -8.21704E-02 | 5.27873E-02 | 8.84302E-05 |
| A14 = | 1.34687E-01 | 3.58793E-02 | -8.81552E-03 | -6.63822E-05 |

FIG. 17

TABLE 11
(Embodiment 6)
f = 3.56 mm, Fno = 2.30, HFOV = 38.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 3.15550 (ASP) | 0.900 | Plastic | 1.583 | 30.2 | -24.66 |
| 2 | | 2.31586 (ASP) | 0.198 | | | | |
| 3 | Ape. Stop | Plano | 0.203 | | | | |
| 4 | Lens 2 | 13.41830 | 2.100 | Glass | 1.801 | 35.0 | 3.06 |
| 5 | | -2.79440 | 0.894 | | | | |
| 6 | Lens 3 | -0.78828 (ASP) | 0.674 | Plastic | 1.583 | 30.2 | -10.57 |
| 7 | | -1.18847 (ASP) | 0.100 | | | | |
| 8 | Lens 4 | 1.70957 (ASP) | 0.931 | Plastic | 1.530 | 55.8 | 6.58 |
| 9 | | 2.72082 (ASP) | 0.800 | | | | |
| 10 | IR-filter | Plano | 0.400 | Glass | 1.517 | 64.2 | - |
| 11 | | Plano | 0.722 | | | | |
| 12 | Image | Plano | - | | | | |

Reference wavelength is 587.6 nm. ASP stands for aspherical surfaces.

FIG. 18

TABLE 12
Aspheric Coefficients

| Surface # | 1 | 2 | 6 | 7 |
|---|---|---|---|---|
| k = | 5.24677E-02 | 1.38837E+00 | -1.89314E+00 | -1.15636E+00 |
| A4 = | 8.23316E-03 | 2.79467E-02 | -6.77736E-03 | 1.32652E-02 |
| A6 = | 5.62195E-04 | -3.99339E-02 | 6.43117E-03 | 2.35600E-03 |
| A8 = | -6.09839E-04 | 1.02293E-01 | 1.45751E-03 | -1.51509E-05 |
| A10 = | 1.43971E-03 | -1.05820E-01 | -7.28298E-05 | 8.63204E-06 |
| A12 = | -1.47994E-03 | 4.38119E-02 | -3.56151E-05 | 9.42546E-06 |
| A14 = | 4.72032E-04 | -1.89178E-02 | 7.03561E-07 | 2.57973E-06 |
| A16 = | -3.09240E-05 | 1.97733E-03 | -3.79211E-07 | 4.13617E-07 |

| Surface # | 8 | 9 |
|---|---|---|
| k = | -3.36560E+00 | -1.00000E+00 |
| A4 = | -1.25728E-02 | -2.92182E-02 |
| A6 = | -3.76950E-04 | 1.91179E-03 |
| A8 = | -1.92292E-04 | -1.28527E-04 |
| A10 = | -4.71530E-06 | -1.41239E-05 |
| A12 = | 5.39559E-07 | -3.02234E-08 |
| A14 = | -1.64742E-07 | 1.42419E-07 |
| A16 = | -1.68040E-07 | -5.86011E-09 |

FIG. 19

TABLE 13

(Embodiment 7)

f = 3.43 mm, Fno = 2.30, HFOV = 29.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 5.54220 (ASP) | 0.563 | Plastic | 1.543 | 56.5 | 11.40 |
| 2 | | 50.88790 (ASP) | 0.100 | | | | |
| 3 | Apc. Stop | Plano | 0.050 | | | | |
| 4 | Lens 2 | 2.79761 (ASP) | 0.841 | Glass | 1.728 | 28.5 | 2.71 |
| 5 | | -5.86230 (ASP) | 0.225 | | | | |
| 6 | Lens 3 | -0.80765 (ASP) | 0.540 | Plastic | 1.633 | 23.4 | -3.58 |
| 7 | | -1.58007 (ASP) | 0.050 | | | | |
| 8 | Lens 4 | 1.80079 (ASP) | 0.883 | Plastic | 1.543 | 56.5 | 8.35 |
| 9 | | 2.47089 (ASP) | 0.500 | | | | |
| 10 | IR-filter | Plano | 0.200 | Glass | 1.517 | 64.2 | - |
| 11 | | Plano | 0.250 | | | | |
| 12 | Cover-glass | Plano | 0.400 | Glass | 1.517 | 64.2 | - |
| 13 | | Plano | 0.527 | | | | |
| 14 | Image | Plano | - | | | | |

Reference wavelength is 587.6 nm. ASP stands for aspherical surfaces.

FIG. 20

TABLE 14
Aspheric Coefficients

| Surface # | 1 | 2 | 4 | 5 |
|---|---|---|---|---|
| k = | -3.17783E+01 | 1.50000E+02 | -1.61145E+01 | 1.07149E+01 |
| A4 = | -2.75095E-02 | -2.33997E-01 | -8.89409E-02 | -1.84149E-01 |
| A6 = | -3.75567E-02 | 1.88944E-01 | -3.14293E-02 | -2.48120E-01 |
| A8 = | 1.69946E-02 | -3.10530E-01 | 1.22500E-01 | 3.72858E-01 |
| A10 = | -6.03806E-04 | 3.25475E-01 | -8.69071E-01 | 1.26286E-01 |
| A12 = | -5.48067E-02 | -2.19967E-01 | 1.42957E+00 | -2.92072E-01 |
| A14 = | 2.89053E-02 | 7.93400E-02 | -7.84705E-01 | 4.89550E-02 |

| Surface # | 6 | 7 | 8 | 9 |
|---|---|---|---|---|
| k = | -3.38752E+00 | -7.74364E+00 | -3.50902E+00 | -1.13248E+00 |
| A4 = | -1.40727E-01 | 9.81529E-02 | -4.79940E-02 | -1.05922E-01 |
| A6 = | 2.35008E-01 | 1.68696E-01 | -2.87488E-02 | 6.00324E-02 |
| A8 = | 7.67006E-02 | 2.78915E-02 | 1.06540E-01 | -3.11362E-02 |
| A10 = | -2.82845E-02 | -4.05561E-02 | -1.13323E-01 | 5.49517E-03 |
| A12 = | -5.01170E-02 | -7.07804E-02 | 6.19969E-02 | 2.50451E-03 |
| A14 = | -4.01922E-02 | 3.37823E-02 | -1.41715E-02 | -9.73316E-04 |

FIG. 21

OPTICAL LENS ASSEMBLY FOR IMAGE TAKING

BACKGROUND OF THE INVENTION

1. Field of the Invention

The present invention relates to an optical lens assembly for image taking, and more particularly to an optical lens assembly composed of four lenses and applied to an electronic product, and the optical lens assembly has the features of short total length and low cost.

2. Description of the Related Art

As science and technology advance, the development of electronic products such as digital still cameras, web cameras, and mobile phone cameras comes with an optical lens assembly with a smaller size and a lower cost to meet user requirements, while providing an optical lens assembly with good aberration correction capability, high resolution, and high image quality.

In general, a conventional optical lens assembly for image taking for a mini electronic product has different designs including the two-lens, three-lens, four-lens, and five-or-more lens designs. If the image quality is taken in consideration, the four-lens and five-lens optical lens assembly provides better aberration correction and modulation transfer function (MTF), and the four-lens optical lens assembly uses less lenses and incurs a lower manufacturing cost than the five-lens optical lens assembly, and thus the four-lens assembly can be used in electronic products that require a high pixel quality.

In the design of various mini four-lens optical lens assemblies for image taking, the prior art adopts a combination of different positive or negative refractive powers, wherein the design having a combination of the first lens element with positive refractive power, the second lens element with positive refractive power, the third lens element with negative refractive power and the fourth lens element with positive refractive power as disclosed in U.S. Pat. Nos. US2007014033, US2008/0024882, U.S. Pat. No. 7,215,492 and U.S. Pat. No. 7,321,474, European Pat. No. EP1821129, Japan Pat. Nos. JP2007-225833, JP2008-020893, JP 2007-286153 and JP 2007-193195, R.O.C. Pat. No. TWM314860 and P.R.C. Pat. No. CN1815287 tends to give a good aberration correction. If the fourth lens element adopts a simple lens shape as disclosed in U.S. Pat. Nos. US2007/0058256, US2007/0070234, US 2007/0242370 and US2008/0043346, and Japan Pat. Nos.: JP2005-091666, JP2005-025174, JP 2004-233654 and JP2007-219520, the yield rate can be improved.

In compact digital cameras, web cameras or mobile phones, the optical lens assembly requires compact design, short focal length and good aberration adjustment. A design having a crescent or bi-concave first lens element and the second lens element with positive refractive power or other combinations as disclosed in U.S. patents, European patents, Japanese patents with Publication Nos. JP2004-061938, JP2007-157031 and JP2004-361934 and R.O.C. patents with Publication No. TW201024789 can meet the miniaturization requirement. However, the optical lens assemblies disclosed in these patents still required a reduction of the total length of the lens. These prior technologies adopt a direct way of shortening the rear focal length. Although the total length of the lens is effectively reduced, the drawback is that the aberration correction is difficult to improve or the image distortion is hard to lower down. On the other hand, the reduction of the total length of the lens can be accomplished by adopting a concave surface (or a convex surface) at the object-side surface of the third lens element or fourth lens element near the optical axis and a convex surface (or a concave surface) while approaching the rim of the lens, such that the curvature has a very large change, but such lens is very difficult to manufacture. Therefore, the present invention provides a more practical design to shorten the optical lens assembly while using a combination of refractive powers, convex surfaces and concave surfaces of the four lenses to reduce the total length of the optical lens assembly, and additionally to improve the image quality and use a simple shape of the lens to lower the manufacturing cost and applying the lens to electronic products.

SUMMARY OF THE INVENTION

Therefore, it is a primary objective of the invention to provide an optical lens assembly for image taking, sequentially from an object side to an image side along an optical axis comprising: the first lens element, the second lens element, the third lens element, and the fourth lens element; wherein the first lens element has positive or negative refractive power; the bi-convex second lens element has positive refractive power; the third lens element with negative refractive power has a concave object-side surface and a convex image-side surface, and at least one of the object-side and image-side surfaces is aspheric; the fourth lens element with positive refractive power has a convex object-side surface and a concave image-side surface, and at least one of the object-side and image-side surfaces has at least one inflection point; and the optical lens assembly for image taking satisfies the first set of conditions as follows:

$$0 < f/f_4 < 0.75; \quad (1)$$

$$-1.0 < (R_3 + R_4)/(R_3 - R_4) < 0.8; \quad (2)$$

$$0 < R_8/f < 1.0; \quad (3)$$

$$1.2 < f/f_2 + f/f_3 < 3.1; \quad (4)$$

Where, f is a focal length of the optical lens assembly for image taking, $f_2$ is a focal length of the second lens element, $f_3$ is a focal length of the third lens element, $f_4$ is a focal length of the fourth lens element, $R_3$ is a curvature radius of the object-side surface of the second lens element, $R_4$ is a curvature radius of the image-side surface of the second lens element, and $R_8$ is a curvature radius of the image-side surface of the fourth lens element. The optical lens assembly for image taking of the present invention further comprises an image sensor installed on an image plane for taking image of an object, wherein the image sensor can be a charge coupled device (CCD) sensor, a complementary metal oxide semiconductor (CMOS) sensor or other type of photosensitive devices, but the invention is not limited to such arrangements only.

On the other hand, the present invention provides an optical lens assembly for image taking, sequentially from an object side to an image side along an optical axis comprising: the first lens element, a stop, the second lens element, the third lens element and the fourth lens element; wherein the first lens element has positive or negative refractive power; the second lens element is a bi-convex lens with positive refractive power; the third lens element with negative refractive power has a concave object-side surface and a convex image-side surface, and both of them are aspherical surfaces; the fourth lens element with positive refractive power is made of a plastic material and has a convex object-side surface and a concave image-side surface, and both of the object-side and image-side surfaces are aspherical surfaces, and at least one of the object-side and image-side surfaces has at least one inflection point; and the stop is disposed between the first lens element and the third lens element. For the purpose of different applications, one or more of the following conditions are furthermore satisfied in addition to the first set of conditions:

$$0.65 < SL/TTL < 0.92; \quad (5)$$

$$-1.0 < (R_3+R_4)/(R_3-R_4) < 0.8, \text{ or preferably}$$

$$-0.5 < (R_3+R_4)/(R_3-R_4) < -0.1; \quad (9)$$

$$-0.6 < f/f_1 < 0.6; \quad (7)$$

$$20 v_4 - v_3 < 40; \quad (8)$$

$$0 < SAG_{32}/Y_{32} < 0.25; \quad (10)$$

where, SL is an axial distance from the stop to an image plane, TTL is an axial distance from the object-side surface of the first lens element to the image plane, $R_3$ is the curvature radius of the object-side surface of the second lens element; $R_4$ is the curvature radius of the image-side surface of the second lens element, f is the focal length of the optical lens assembly for image taking, $f_1$ is a focal length of the first lens element, $v_3$ is an Abbe number of the third lens element, $v_4$ is an Abbe number of the fourth lens element, $Y_{32}$ is a vertical distance from the maximum-range position where the light passes through the image-side surface of the third lens element to the optical axis, and $SAG_{32}$ is a distance between a position at the image-side surface of the third lens element having a distance of $Y_{32}$ from the optical axis to a tangent plane at the tip of the optical axis of the third lens element.

The present invention further provides an optical lens assembly for image taking, sequentially from an object side to an image side along an optical axis comprising: the first lens element, the second lens element, the third lens element, the fourth lens element, an image sensor and a stop formed in the lens; wherein the first lens element has positive or negative refractive power; and the bi-convex second lens element with positive refractive power is made of glass; and the third lens element with negative refractive power has a concave object-side surface and a convex image-side surface, and both of the object-side and image-side surfaces are aspherical surfaces; and the fourth lens element with positive refractive power is made of plastic, and has a convex object-side surface and a concave image-side surface, and both of the object-side and image-side surfaces are aspherical surfaces and at least one of the object-side and image-side surfaces has at least one inflection point; and the image sensor is installed on an image plane for taking images. For the purpose of different applications, one or more of the following conditions are furthermore satisfied in addition to the first set of conditions:

$$0.65 < SL/TTL < 0.92; \quad (5)$$

$$-1.0 < (R_3+R_4)/(R_3-R_4) < 0.0, \quad (6)$$

$$\text{or preferably, } -1.0 < (R_3+R_4)/(R_3-R_4) < -0.1; \quad (12)$$

$$-0.6 < f/f_1 < 0.6, \quad (7)$$

$$\text{or preferably, } -0.3 < f/f_1 < 0.3; \quad (14)$$

$$N_2 > 1.7; \quad (11)$$

$$1.7 < f/f_2 + f/f_3 < 2.8; \quad (13)$$

where, SL is the axial distance from the stop to the image plane of the image sensor, TTL is the axial distance from the object-side surface of the first lens element to the image plane, $R_3$ is the curvature radius of the object-side surface of the second lens element, $R_4$ is the curvature radius of the image-side surface of the second lens element, f is the focal length of the optical lens assembly for image taking, $f_1$ is the focal length of the first lens element, $f_2$ is the focal length of the second lens element, $f_3$ is the focal length of the third lens element, and $N_2$ is a refractive index of the second lens element.

Another objective of the present invention is to provide an optical lens assembly for image taking, sequentially from an object side to an image side along an optical axis comprising: the first lens element, the second lens element, the third lens element and the fourth lens element; wherein the first lens element has positive or negative refractive power; the bi-convex second lens element has positive refractive power; the third lens element with negative refractive power has a concave object-side surface and a convex image-side surface, and both of the object-side and image-side surfaces are aspherical surfaces; the fourth lens element with positive refractive power has a convex object-side surface and a concave image-side surface, and both of the object-side and image-side surfaces are aspherical surfaces; and the optical lens assembly for image taking satisfies the second set of conditions as follows:

$$0 < f/f_4 < 0.75; \quad (1)$$

$$-1.0 < (R_3+R_4)/(R_3-R_4) < 0.0; \quad (6)$$

$$-0.6 < f/f_1 < 0.6; \quad (7)$$

$$0 < R_8/f < 5.0; \quad (15)$$

where, f is a focal length of the optical lens assembly for image taking, $f_1$ is a focal length of the first lens element, $f_r$ is a focal length of the fourth lens element, $R_3$ is a curvature radius of the object-side surface of the second lens element, $R_4$ is a curvature radius of the image-side surface of the second lens element, and $R_8$ is a curvature radius of the image-side surface of the fourth lens element.

The present invention further provides an optical lens assembly for image taking, sequentially from an object side to an image side along an optical axis comprising: the first lens element, the second lens element, the third lens element and the fourth lens element; wherein the first lens element has positive or negative refractive power; the bi-convex second lens element has positive refractive power; the third lens element with negative refractive power is made of plastic and has a concave object-side surface and a convex image-side surface, and both of the object-side and image-side surfaces are aspherical surfaces; the fourth lens element with positive refractive power is made of plastic and has a convex object-side surface and a concave image-side surface, and both of the object-side and image-side surfaces are aspherical surfaces. For the purpose of different applications, one or more of the following conditions are furthermore satisfied in addition to the second set of conditions:

$$0 < R_8/f < 2.0; \quad (17)$$

$$\text{or preferably, } 0 < R_8/f < 1.0; \quad (3)$$

$$1.2 < f/f_2 + f/f_3 < 3.1; \quad (4)$$

$$20 < v_4 - v_3 < 40; \quad (8)$$

$$0 < SAG_{32}/Y_{32} < 0.25; \quad (10)$$

$$N_2 > 1.7; \quad (11)$$

$$-0.3 < f/f_1 < 0.3; \quad (14)$$

$$0 < f/f_4 < 0.55; \quad (16)$$

where, f is the focal length of the optical lens assembly for image taking; $f_1$ is the focal length of the first lens element; $f_2$ is a focal length of the second lens element; $f_3$ is a focal length of the third lens element; $f_4$ is the focal length of the fourth lens element; $R_8$ is the curvature radius of the image-side surface of the fourth lens element; the third lens element has an Abbe number $v_3$; the fourth lens element has an Abbe number $v_4$; the second lens element has a refractive index $N_2$; $Y_{32}$ is a vertical distance from the maximum-range position where the light passes through the image-side surface of the third lens element to the optical axis; and $SAG_{32}$ is a distance between a position at the image-side surface of the third lens element having a distance of $Y_{32}$ from the optical axis to a tangent plane at the tip of the optical axis of the third lens element.

With the aforementioned first lens element, second lens element, third lens element and fourth lens element of the present invention installed with an appropriate distance apart from each other on the optical axis, the total length of the optical lens assembly can be reduced effectively and good aberration correction and modulation transfer function (MTF) can be achieved.

In the optical lens assembly for image taking in accordance with the present invention, the second lens element has positive refractive power to provide the required refractive power for the system and help reducing the total length of the optical lens assembly for image taking; and the third lens element has negative refractive power for effectively compensating the image aberration produced by the first and second lens elements with positive refractive power, and correcting the Petzval sum of the system to make the peripheral image surface flatter and favors the correction of the color difference of the system to improve the resolution of the optical lens assembly for image taking; and the fourth lens element with positive refractive power further improves the refractive power and modulation transfer function (MTF), such that the overall image aberration and distortion of the optical lens assembly for image taking can comply with the high resolution requirement.

In the optical lens assembly for image taking in accordance with the present invention, the combination of the first and second lens elements can enhance the refractive power effectively to shorten the total length of the optical lens assembly for image taking. The combination of the third lens element with a concave object-side surface and a convex image-side surface and the fourth lens element with a convex object-side surface and a concave image-side surface can correct the astigmatic image. Further, the first lens element, third lens element and fourth lens element are made of plastic, and a simple surface shape favors the manufacture and lower the low cost.

BRIEF DESCRIPTION OF THE DRAWINGS

FIG. 8 shows Table 1 that lists optical data of the first preferred embodiment of the present invention;
FIG. 9 shows Table 2 that lists aspherical surface data of the first preferred embodiment of the present invention;
FIG. 10 shows Table 3 that lists optical data of the second preferred embodiment of the present invention;
FIG. 11 shows Table 4 that lists aspherical surface data of the second preferred embodiment of the present invention;
FIG. 12 shows Table 5 that lists optical data of the third preferred embodiment of the present invention;
FIG. 13 shows Table 6 that lists aspherical surface data of the third preferred embodiment of the present invention;
FIG. 14 shows Table 7 that lists optical data of the fourth preferred embodiment of the present invention;
FIG. 15 shows Table 8 that lists aspherical surface data of the fourth preferred embodiment of the present invention;
FIG. 16 shows Table 9 that lists optical data of the fifth preferred embodiment of the present invention;
FIG. 17 shows Table 10 that lists aspherical surface data of the fifth preferred embodiment of the present invention;
FIG. 18 shows Table 11 that lists optical data of the sixth preferred embodiment of the present invention;
FIG. 19 shows Table 12 that lists aspherical surface data of the sixth preferred embodiment of the present invention;
FIG. 20 shows Table 13 that lists optical data of the seventh preferred embodiment of the present invention;
and
FIG. 21 shows Table 14 that lists aspherical surface data of the seventh preferred embodiment of the present invention.

DETAILED DESCRIPTION OF THE PREFERRED EMBODIMENTS

Figure 1A:
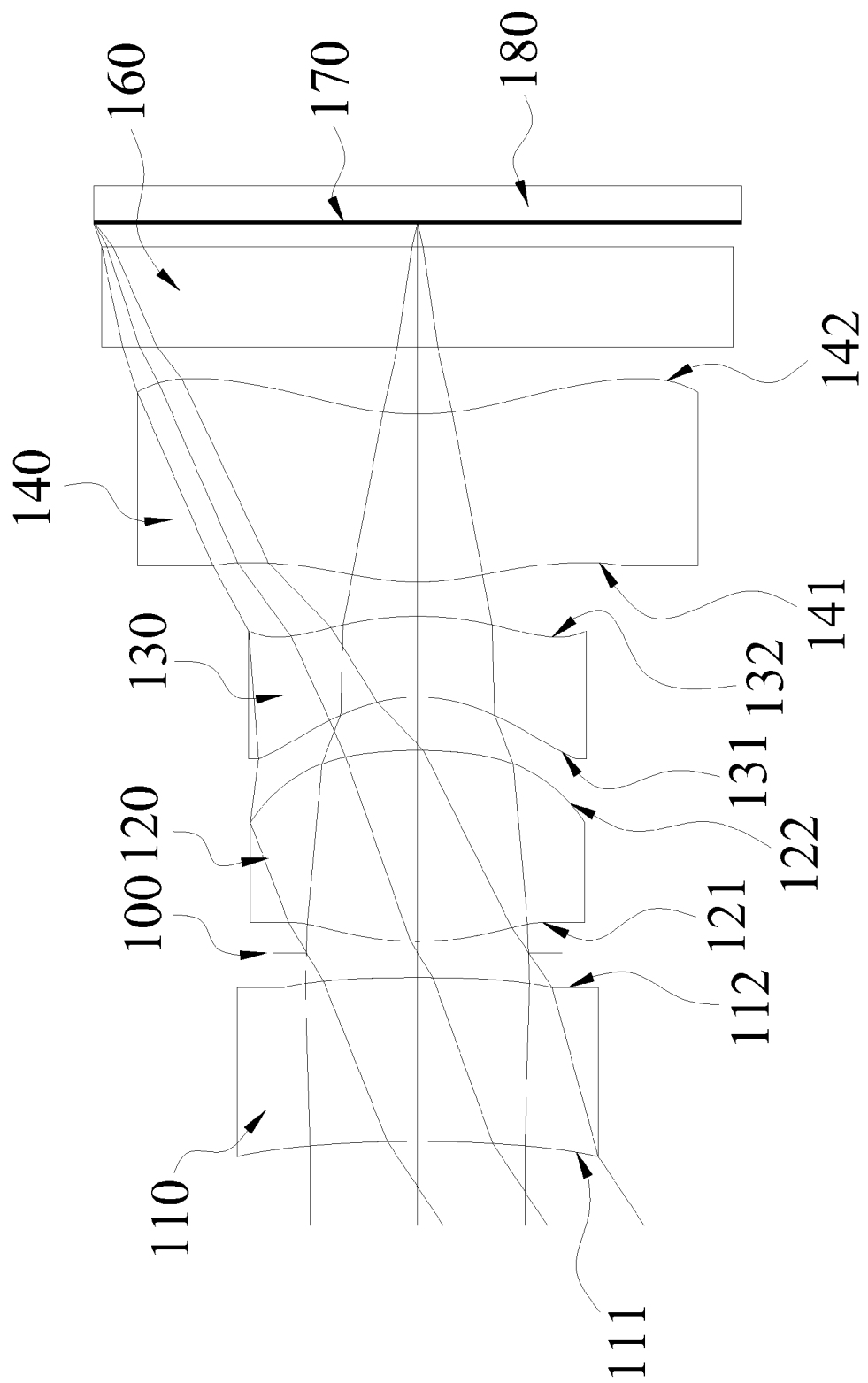
FIG. 1A is a schematic view of an optical lens assembly for image taking in accordance with the first preferred embodiment of the present invention.

The technical measures taken by the present invention to achieve the foregoing objectives and effects will become apparent with the detailed description of preferred embodiments together with related drawings as follows. It is noteworthy to point out that same numerals are used for representing same respective elements in the drawings for the purpose of illustrating the present invention.

With reference to FIG. 1A for a schematic view of an optical lens assembly for image taking in accordance with the first embodiment of the present invention, the optical lens assembly for image taking sequentially from an object side to an image side along an optical axis comprises: the first lens element (110), the second lens element (120), the third lens element (130), the fourth lens element (140), an infrared filter (160) and an image sensor (180); wherein both object-side surface (111) and image-side surface (112) of the first lens element (110) are aspherical surfaces or spherical surfaces; the bi-convex second lens element (120) has an object-side surface (121) and an image-side surface (122) which are both aspherical surfaces or spherical surfaces; the third lens element (130) has an object-side surface (131) which is a concave surface and an image-side surface (132) which is a convex surface, and the third lens element has at least one aspherical surface for the object-side surface (131) and image-side surface (132); the fourth lens element (140) has an object-side surface (141) which is a convex surface and an image-side surface (142) which is a concave surface, and the image-side surface (142) of the fourth lens element is an aspherical surface and includes at least one inflection point; the image sensor (180) is installed on an image plane (170) for taking image of an object. The aspherical optical surfaces of the first lens element (110), second lens element (120), third lens element (130) and fourth lens element (140) satisfy the aspherical surface formula as follows:

$$X(Y) = \frac{(Y^2/R)}{1+\sqrt{(1-(1+K)(Y/R)^2)}} + \sum_i (A_i) \cdot (Y^i) \quad (18)$$

where,

X is the relative height from a point on the aspherical surface with a distance Y from the optical axis to a tangent plane at the tip of the optical axis of the aspherical surface;

Y is the distance between a point on the curve of the aspherical surface and the optical axis;

K is the conic coefficient; and $A_i$ is the $i^{th}$ level aspherical surface coefficient.

The optical lens assembly for image taking in accordance with the present invention with the installation of the aforementioned first lens element (110), second lens element (120), third lens element (130), fourth lens element (140) and image sensor (180) satisfies the first set of conditions including Conditions (1), (2), (3) and (4). If the ratio of the curvature radius $R_4$ of the image-side surface (142) of the fourth lens element (140) to the focal length $f_4$ of the fourth lens element (140) is limited as shown in Conditions (1) and (3), the image aberration of an image passing through the image-side surface (142) of the fourth lens element can be reduced, and the principal point of the optical lens assembly and the image plane (170) are limited to farther positions to shorten the total length of the optical lens assembly. Since the object-side surface (121) of the second lens element is a convex surface, therefore the image quality of the second lens element (120) can be improved if the difference between the curvature radius $R_3$ of the object-side surface (121) of the second lens element (120) and the curvature radius $R_4$ of the image-side surface (122) of the second lens element (120) is reduced as shown in Condition (2). Similarly, if the ratio of the focal length $f_2$ of the second lens element (120) to the overall focal length f of the optical lens assembly for image taking (or the absolute value) is reduced, or the ratio of the focal length $f_3$ of the third lens element (130) to the overall focal length f of the optical lens assembly for image taking (or the absolute value) is reduced as shown in Condition (4), the required refractive power of the optical lens assembly can be distributed effectively by the third lens element (130) for enhancing the sensitivity of the optical lens assembly composed of the second lens element (120) and the third lens element (130).

The optical lens assembly for image taking in accordance with the present invention further comprises an aperture stop (100) disposed between the first lens element (110) and the second lens element (120), and being a middle aperture stop; both optical surfaces of the third lens element (130) and fourth lens element (140) are aspherical surfaces and made of plastic. In addition to the first set of conditions, this optical lens assembly also satisfies one or a combination of conditions (5), (6), (7), (8), (9) and (10). If the difference between the Abbe numbers of the third lens element (130) and fourth lens element (140) are limited as shown in Condition (8), the correction of color difference in the optical lens assembly can be improved. If the ratio of the axial distance SL from the object-side surface of the aperture stop (100) to the image plane (170) of the image sensor (180) to the axial distance TTL from the object-side surface (111) of the first lens element to the image plane (170) of the image sensor (180) is limited as shown in Condition (5), the optical lens assembly can achieve a good balance of telecentric feature and a wider field angle of view, and shorten the total length of the optical lens assembly for image taking effectively to comply with the thin design requirement.

The optical lens assembly for image taking in accordance with the present invention further comprises an aperture stop (100) disposed between the first lens element (110) and the second lens element (120), and being a middle aperture stop; both optical surfaces of the third lens element (130) and fourth lens element (140) are aspherical surfaces and made of plastic, and the second lens element (120) is made of glass. In addition to the first set conditions, this optical lens assembly also satisfies one or a combination of Conditions (5), (6), (7), (11), (12), (13) and (14). If the ratio of the maximum effective range of the image-side surface (132) of the third lens element (130) (which is the vertical distance $Y_{32}$) to the distance ($SAG_{32}$) from the tangent plane at the top of the optical axis of the third lens element (130) is increased (or $SAG_{32}$ is increased) as shown in Condition (10), the shape of the image-side surface (132) of the third lens element (130) becomes more convexly (or the curvature becomes larger) which favors the light focusing.

The optical lens assembly for image taking in accordance with the present invention sequentially from an object side to an image side along an optical axis comprises: the first lens element (110), the second lens element (120), the third lens element (130), the fourth lens element (140), an infrared filter (160) and an image sensor (180); wherein both object-side surface (111) and image-side surface (112) of the first lens element (110) are aspherical surfaces or spherical surfaces; the bi-convex second lens element (120) has an object-side surface (121) and an image-side surface (122) which are both aspherical surfaces or spherical surfaces; the third lens element (130) has an object-side surface (131) which is a concave surface, and an image-side surface (132) which is a convex surface, and both object-side surface (131) and image-side surface (132) of the third lens element (130) are aspherical surfaces; the fourth lens element (140) ahs an object-side surface (141) which is a convex surface and an image-side surface (142) which is a concave surface, and both object-side surface (141) and image-side surface (142) of the fourth lens element (140) are aspherical surfaces; the image sensor (180) is installed on the image plane (170) for taking an image of an object. With the aforementioned installation, the optical lens assembly satisfies the second set of conditions including Conditions (1), (6), (15) and (7).

In optical lens assembly for image taking in accordance with the present invention, the third lens element (130) and fourth lens element (140) are made of plastic, and the second lens element (120) is made of glass. In addition to the second set of conditions, the optical lens assembly also satisfies one or a combination of Conditions (17), (8), (4), (16), (3), (11), (10) and (14) for the purpose of different applications.

Figure 7A:
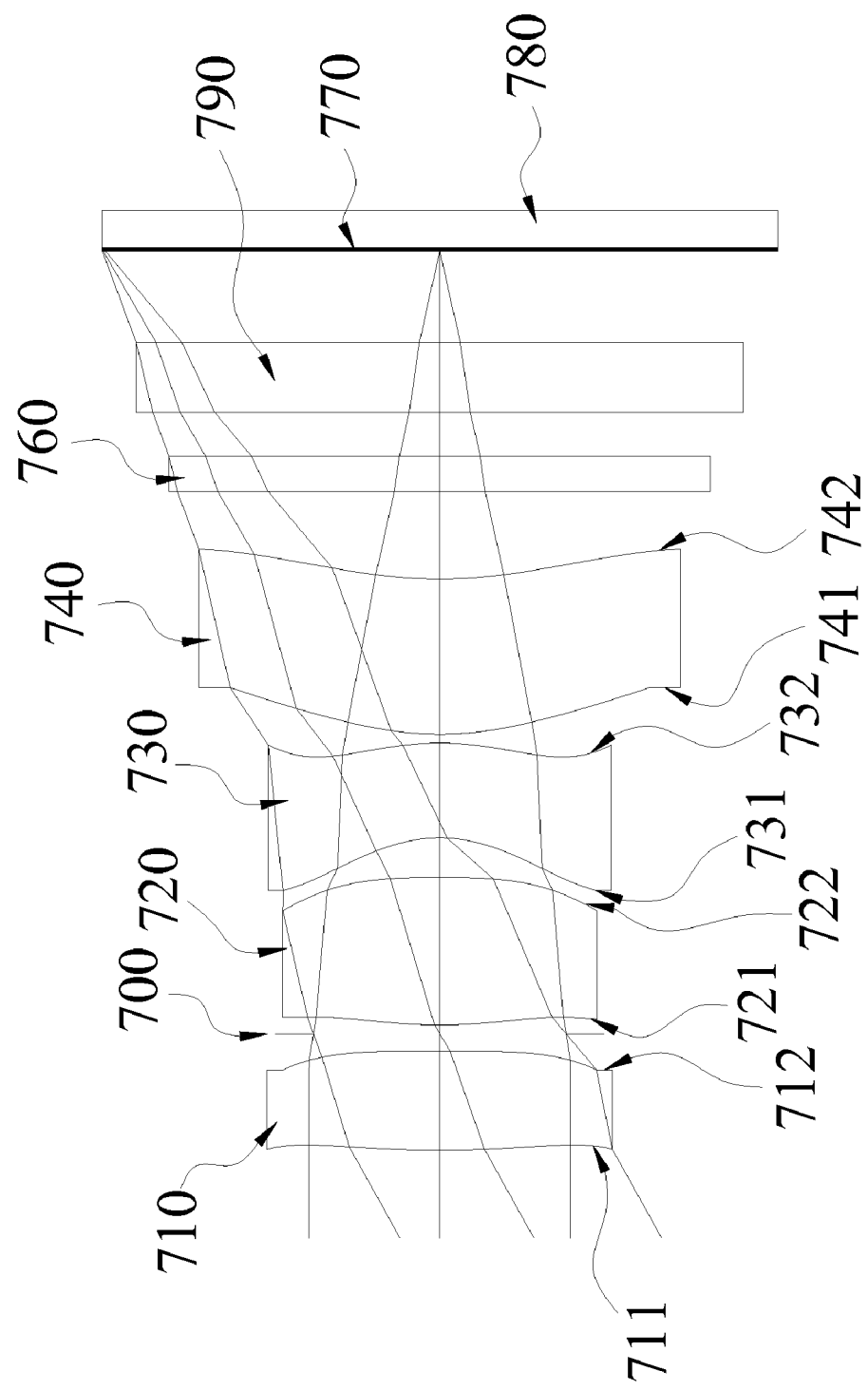
FIG. 7A is a schematic view of an optical lens assembly for image taking in accordance with the seventh preferred embodiment of the present invention.

With reference to FIG. 7A for a schematic vies of an optical lens assembly for image taking in accordance with the seventh preferred embodiment of the present invention, a cover-glass (790) is added, and the cover-glass (790) can be coated with a film to improve the light filtration effect but not limited. The optical lens assembly for image taking sequentially from an object side to an image side along an optical axis comprises: the first lens element (710), an aperture stop (700), the second lens element (720), the third lens element (730), the fourth lens element (740), an infrared filter (760), a cover-glass (790) and an image sensor (780). Since the cover-glass (790) is sheet in shape and has no refractive power, which only affects the distance from the fourth lens element (740) to the image sensor (780) but not the optical imaging effect produced by the first lens element (710), second lens element (720), third lens element (730) and fourth lens element (740).

The optical lens assembly for image taking in accordance with the present invention are described and illustrated by preferred embodiments together with related drawings as follows.

First Preferred Embodiment

Figure 1B:
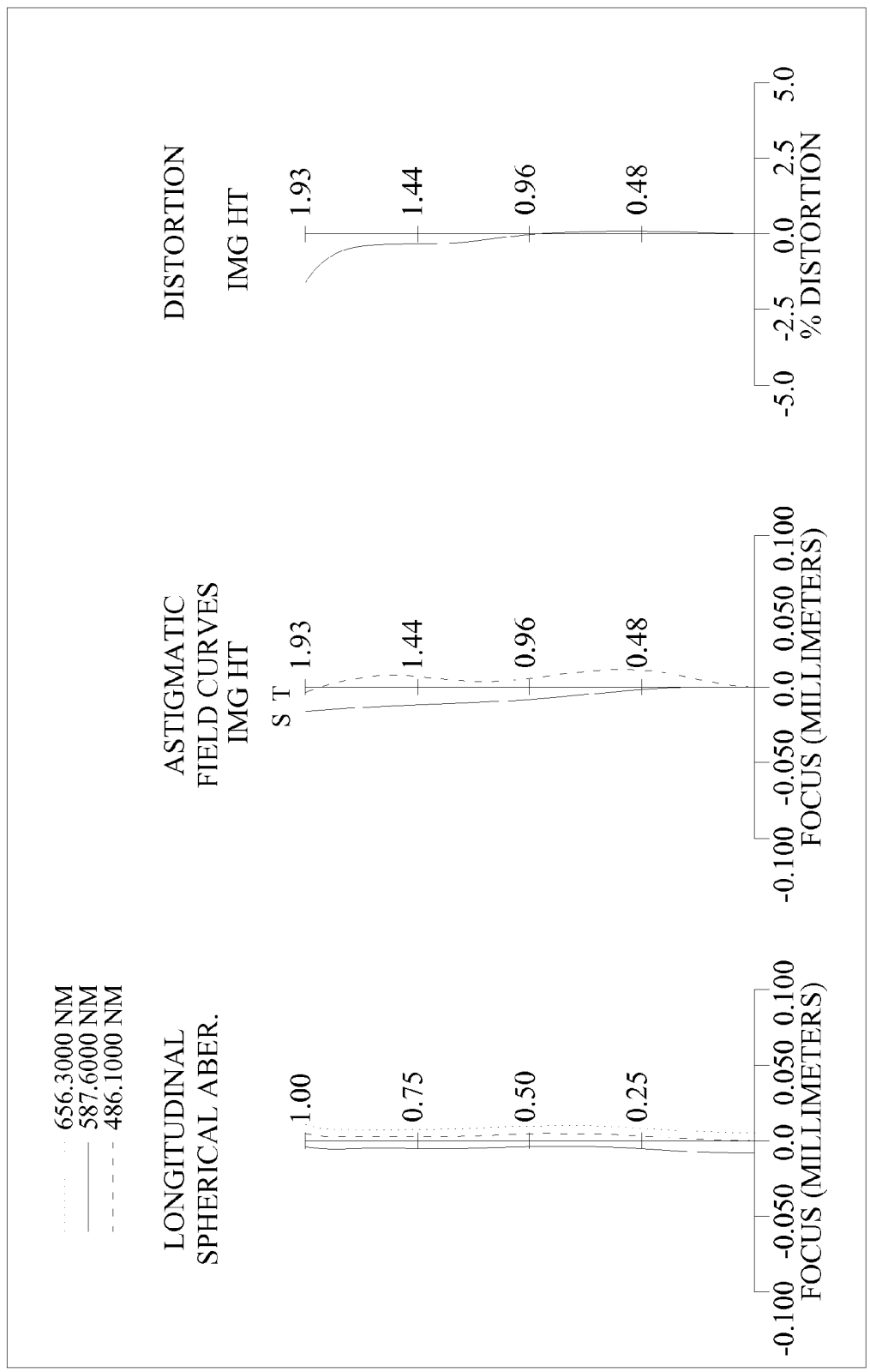
FIG. 1B is a series of aberration curves of the first preferred embodiment of the present invention.

With reference to FIGS. 1A and 1B for a schematic view and a series of aberration curves of an optical lens assembly for image taking in accordance with the first preferred embodiment of the present invention respectively, the optical lens assembly comprises four lenses, an infrared filter (160) and an image sensor (180) to provide a larger view angle, wherein the optical lens assembly sequentially from an object side to an image side along an optical axis comprises: the first lens element (110) with negative refractive power being made of a plastic material and having a concave object-side surface (111) and a convex image-side surface (112), and both object-side surface (111) and image-side surface (112) are aspherical surfaces; a bi-convex second lens element (120) with positive refractive power being made of a plastic material, and having both aspherical object-side surface (121) and image-side surface (122); the third lens element (130) with negative refractive power being made of a plastic material and having a concave object-side surface (131) and a convex image-side surface (132), and both object-side surface (131) and image-side surface (132) are aspherical surfaces; the fourth lens element (140) with positive refractive power, being made of a plastic material and having an inflection point, a concave object-side surface (141) and a concave image-side surface (142), and both object-side surface (141) and image-side surface (142) being aspheric; the infrared filter (IR-filter) (160) made of a glass material in form of a sheet glass which does not affect the focal length of the optical lens assembly; and the image sensor (180) installed on an image plane (170).

With reference to FIG. 8 (which is Table 1) for optical data of the first preferred embodiment, the object-side surface (111) and image-side surface (112) of the first lens element, the object-side surface (121) and image-side surface (122) of the second lens element, the object-side surface (131) and image-side surface (132) of the third lens element, and the object-side surface (141) and image-side surface (142) of the fourth lens element comply with an aspherical surface formula as shown in Equation (18), and the aspherical surface coefficients are listed in FIG. 9 (which is Table 2).

In the optical lens assembly for image taking in accordance with the first preferred embodiment, the optical lens assembly has an overall focal length f=2.94 (mm), an overall aperture stop value (f-number) Fno=2.30, a half of the maximum view angle HFOV=33.7 (degrees), and the second lens element (120) with a refractive index $N_2$=1.530.

Table 1 shows the optical data of the optical lens assembly for image taking in accordance with this preferred embodiment, wherein the curvature radius of the object-side surface (121) of the second lens element (120) is $R_3$, the curvature radius of the image-side surface (122) of the second lens element (120) is $R_4$, and the curvature radius of the image-side surface (142) of the fourth lens element (140) is $R_8$, the focal length of the second lens element (120) is $f_2$, the focal length of the third lens element (130) is $f_3$, the focal length of the fourth lens element (140) is $f_4$, and the optical lens assembly satisfies the relations of $f/f_4$=0.32, $(R_3+R_4)/(R_3-R_4)$=−0.27, $R_8/f$=0.54 and $|f/f_2|+|f/f_3|$=2.25.

In this preferred embodiment, the optical lens assembly further comprises an aperture stop (100) disposed between the first lens element (110) and the second lens element (120), and the axial distance from the aperture stop (100) to the image plane (170) is SL, and the axial distance from the object-side surface (111) of the first lens element (110) to the image plane (170) is TTL, therefore satisfy the relation of SL/TTL=0.79. In this preferred embodiment, the focal length of the first lens element (110) is $f_1$, and the overall focal length of the optical lens assembly is f, so as to satisfy the relation of $f/f_1$=−0.06. The Abbe number of the fourth lens element (140) of the optical lens assembly is $v_4$=56.5, and the Abbe number of the third lens element (130) is $v_3$=23.4, as for satisfying the relation of $v_4-v_3$=33.1. The vertical distance from a light passed from a maximum-range position through the image-side surface (132) of the third lens element (130) to the optical axis is $Y_{32}$, and the distance from the position at the image-side surface (132) of the third lens element (130) at the position with a distance of $Y_{32}$ from the optical axis to a tangent plane at the tip of the optical axis of the third lens element is $SAG_{32}$, and satisfy the relation of $SAG_{32}/Y_{32}$=0.09.

From the optical data shown in FIG. 8 (which is Table 1) and the aberration curve as shown in FIG. 1B, the optical lens assembly for image taking in accordance with this preferred embodiment of the present invention achieves a good compensation effect on the longitudinal spherical aberration, astigmatic field curving and distortion.

Second Preferred Embodiment

Figure 2A:
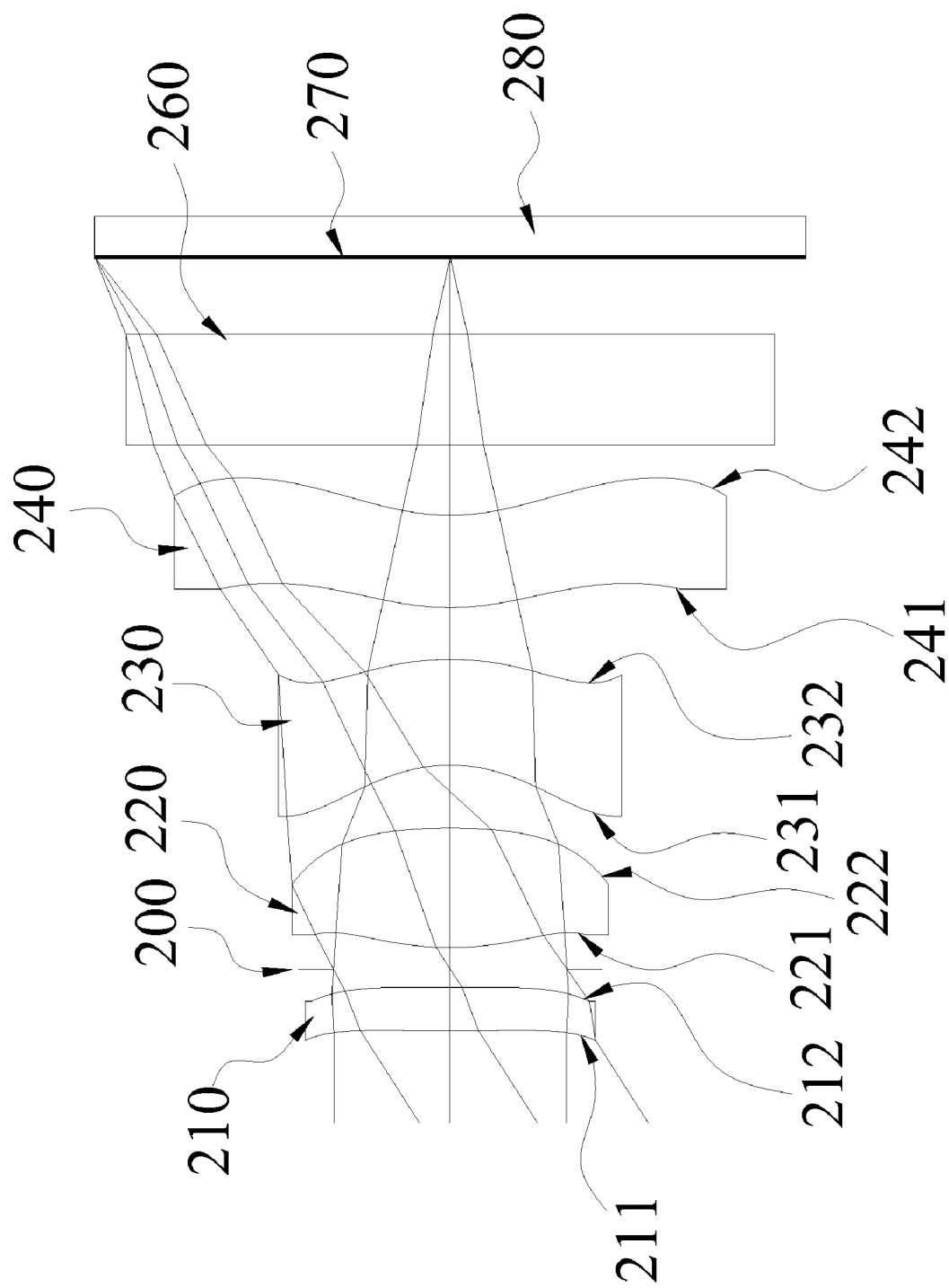
FIG. 2A is a schematic view of an optical lens assembly for image taking in accordance with the second preferred embodiment of the present invention.
Figure 2B:
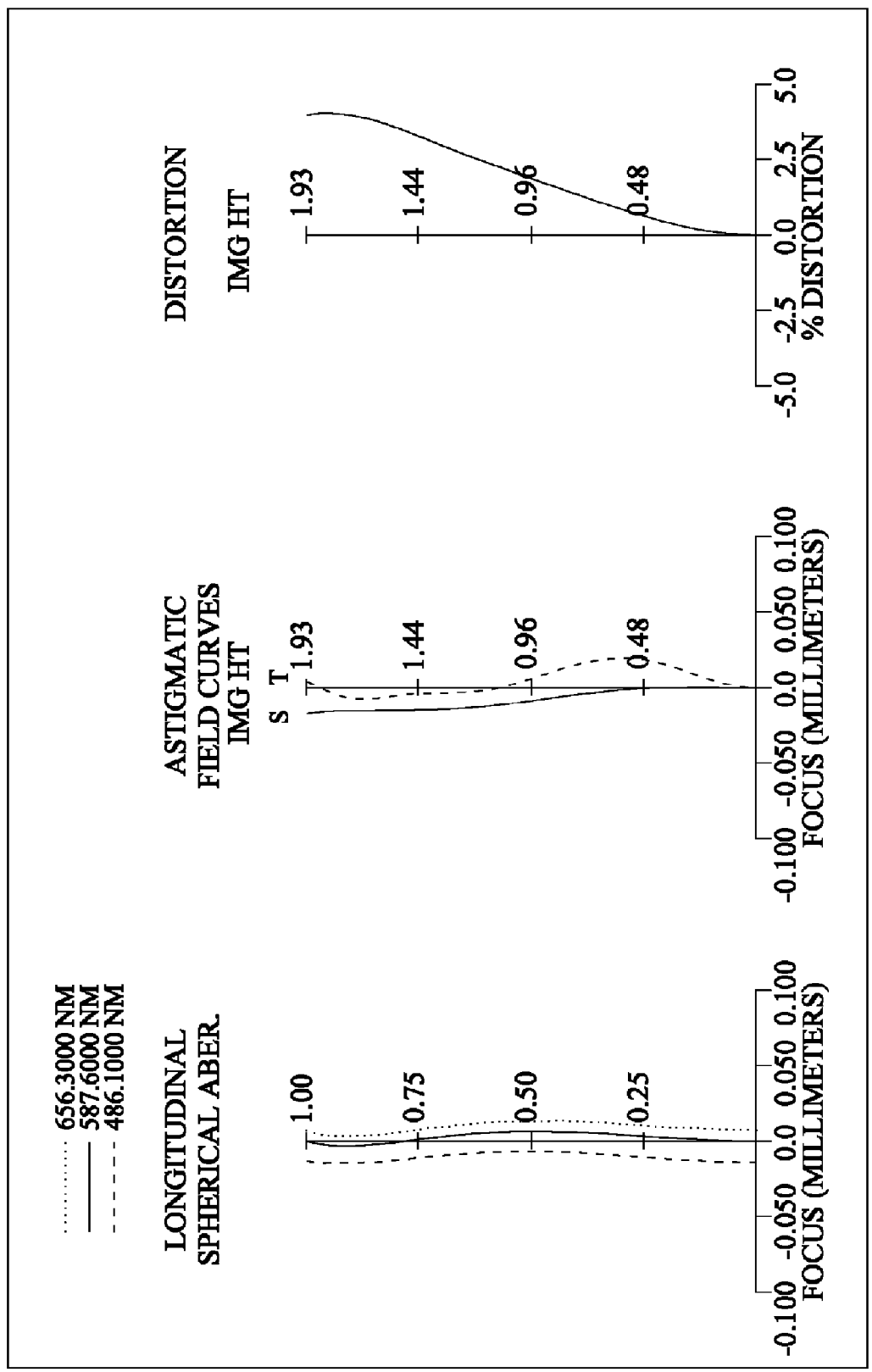
FIG. 2B is a series of aberration curves of the second preferred embodiment of the present invention.

With reference to FIGS. 2A and 2B for a schematic view and a series of aberration curves of an optical lens assembly for image taking in accordance with the second preferred embodiment of the present invention respectively, the optical lens assembly comprises four lenses, an infrared filter (260) and an image sensor (280) to provide a shorter total length of the optical lens assembly, wherein the optical lens assembly sequentially from an object side to an image side along an optical axis comprises: the first lens element (210) with positive refractive power being made of a plastic material and having a convex object-side surface (211) and a concave image-side surface (212), and both object-side surface (211) and image-side surface (212) being aspheric; a bi-convex second lens element (220) with positive refractive power being made of a plastic material and having both aspherical object-side surface (221) and image-side surface (222); the third lens element (230) with negative refractive power being made of a plastic material and having a concave object-side surface (231) and a convex image-side surface (232), and both object-side surface (231) and image-side surface (232) being aspheric; the fourth lens element (240) with positive refractive power being made of a plastic material and having an inflection point, a convex object-side surface (241) and a concave image-side surface (242), and both object-side surface (241) and image-side surface (242) being aspheric; the infrared filter (IR-filter) (260) made of a glass material in form of a sheet glass which does not affect the focal length of the optical lens assembly; and the image sensor (280) installed on an image plane (270).

With reference to FIG. 10 (which is Table 3) for optical data of the second preferred embodiment, the object-side surface (211) and image-side surface (212) of the first lens element, the object-side surface (221) and image-side surface (222) of the second lens element, the object-side surface (231) and image-side surface (232) of the third lens element, and the object-side surface (241) and image-side surface (242) of the fourth lens element comply with an aspherical surface formula as shown in Equation (18), and the aspherical surface coefficients are listed in FIG. 11 (which is Table 4).

In the optical lens assembly for image taking in accordance with the second preferred embodiment, the optical lens assembly has an overall focal length f=2.91 (mm), an overall aperture stop value (f-number) Fno=2.30, a half of the maximum view angle HFOV=32.5 (degrees), and the second lens element (220) with a refractive index $N_2$=1.543.

Table 3 shows the optical data of the optical lens assembly for image taking in accordance with this preferred embodiment, wherein the curvature radius of the object-side surface (221) of the second lens element (220) is $R_3$, the curvature radius of the image-side surface (222) of the second lens element (220) is $R_4$, and the curvature radius of the image-side surface (242) of the fourth lens element (240) is $R_8$, the focal length of the second lens element (220) is $f_2$, the focal length of the third lens element (230) is $f_3$, the focal length of the fourth lens element (240) is $f_4$, and the optical lens assembly satisfies the relations of $f/f_4$=0.04, $(R_3+R_4)/(R_3-R_4)$=−0.31, $R_8/f$=0.41 and $|f/f_2|+|f/f_3|$=2.01.

In this preferred embodiment, the optical lens assembly further comprises an aperture stop (200) disposed between the first lens element (210) and the second lens element (220), and the axial distance from the aperture stop (200) to the image plane (270) is SL, and the axial distance from the object-side surface (211) of the first lens element (210) to the image plane (270) is TTL, therefore satisfy the relation of SL/TTL=0.92. In this preferred embodiment, the focal length of the first lens element (210) is $f_1$, and the overall focal length of the optical lens assembly is f, so as to satisfy the relation of $f/f_1$=0.05. The Abbe number of the fourth lens element (240) of the optical lens assembly is $v_4$=56.5, and the Abbe number of the third lens element (230) is $v_3$=23.8, as for satisfying the relation of $v_4-v_3$=32.7. The vertical distance from a light passed from a maximum-range position through the image-side surface (232) of the third lens element (230) to the optical axis is $Y_{32}$, and the distance from the position at the image-side surface (232) of the third lens element (230) at the position with a distance of $Y_{32}$ from the optical axis to a tangent plane at the tip of the optical axis of the third lens element is $SAG_{32}$, and satisfy the relation of $SAG_{32}/Y_{32}$=0.09.

From the optical data shown in FIG. 10 (which is Table 3) and the aberration curve as shown in FIG. 2B, the optical lens assembly for image taking in accordance with this preferred embodiment of the present invention achieves a good compensation effect on the longitudinal spherical aberration, astigmatic field curving and distortion.

Third Preferred Embodiment

Figure 3A:
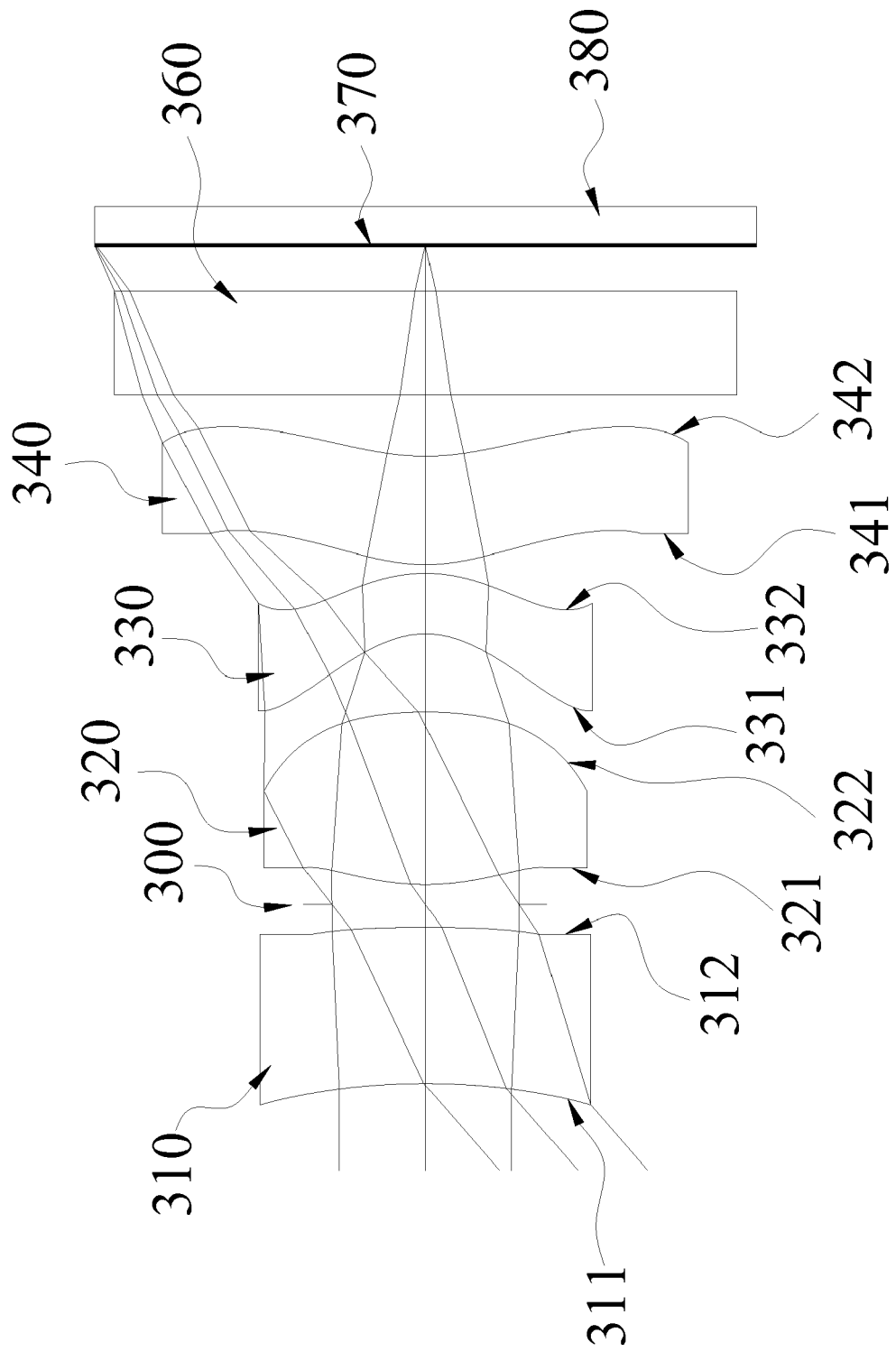
FIG. 3A is a schematic view of an optical lens assembly for image taking in accordance with the third preferred embodiment of the present invention.
Figure 3B:
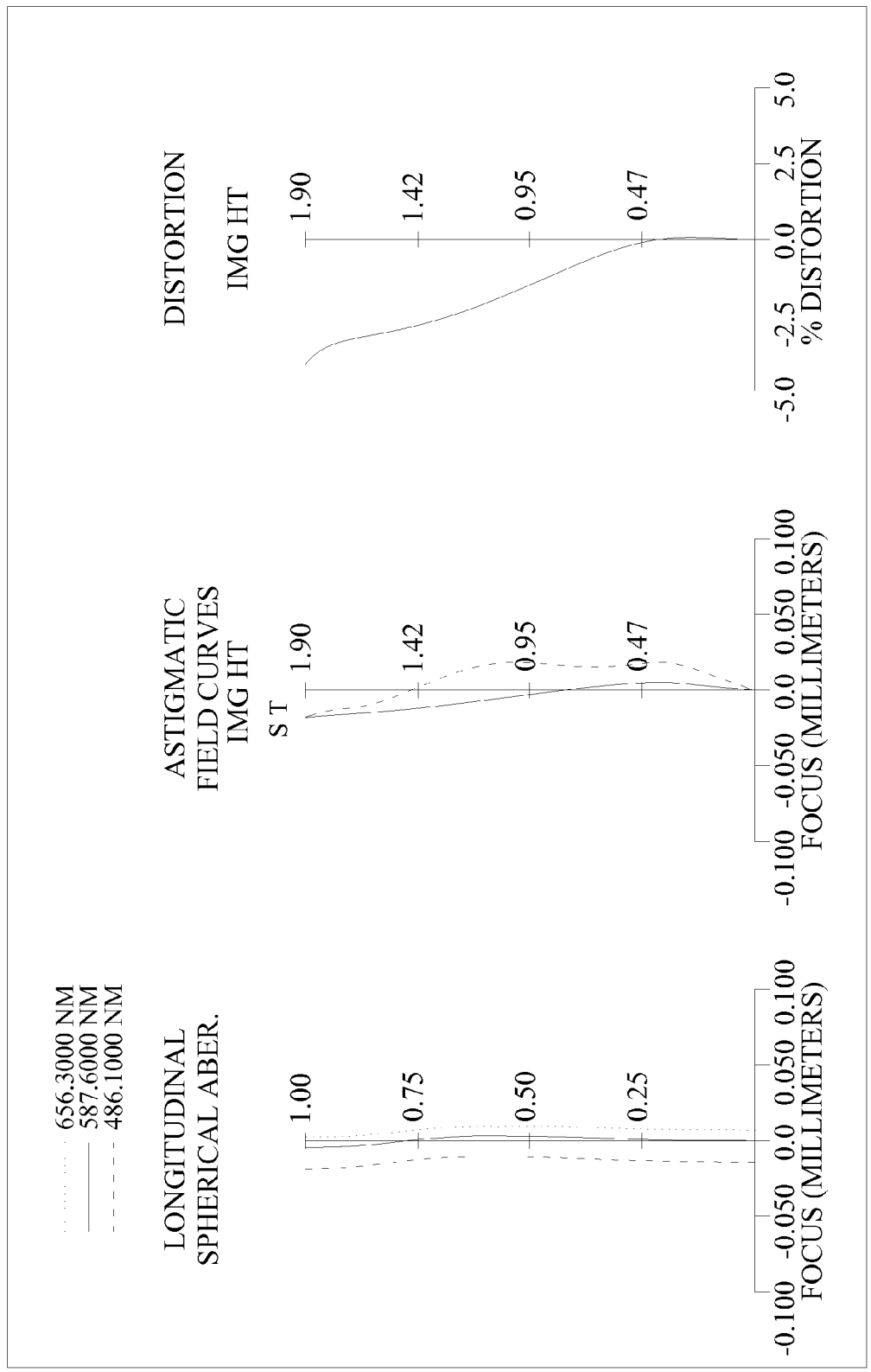
FIG. 3B is a series of aberration curves of the third preferred embodiment of the present invention.

With reference to FIGS. 3A and 3B for a schematic view and a series of aberration curves of an optical lens assembly for image taking in accordance with the third preferred embodiment of the present invention respectively, the optical lens assembly comprises four lenses, an infrared filter (360) and an image sensor (380) to provide a larger view angle, wherein the optical lens assembly sequentially from an object side to an image side along an optical axis comprises: the first lens element (310) with negative refractive power being made of a plastic material and having a concave object-side surface (311) and a convex image-side surface (312), and both object-side surface (311) and image-side surface (312) being aspheric; a bi-convex second lens element (320) with positive refractive power being made of a plastic material, and having both aspherical object-side surface (321) and image-side surface (322); the third lens element (330) with negative refractive power, being made of a plastic material and having a concave object-side surface (331) and a convex image-side surface (332), and both object-side surface (331) and image-side surface (332) being aspheric; the fourth lens element (340) with positive refractive power being made of a plastic material and having an inflection point, a convex object-side surface (341) and a concave image-side surface (342), and both object-side surface (341) and image-side surface (342) being aspheric; the infrared filter (IR-filter) (360) made of a glass material in form of a sheet glass which does not affect the focal length of the optical lens assembly; and the image sensor (380) installed on an image plane (370).

With reference to FIG. 12 (which is Table 5) for optical data of the third preferred embodiment, the object-side surface (311) and image-side surface (312) of the first lens element, the object-side surface (321) and image-side surface (322) of the second lens element, the object-side surface (331) and image-side surface (332) of the third lens element, and the object-side surface (341) and image-side surface (342) of the fourth lens element comply with an aspherical surface formula as shown in Equation (18), and the aspherical surface coefficients are listed in FIG. 13 (which is Table 6).

In the optical lens assembly for image taking in accordance with the third preferred embodiment, the optical lens assembly has an overall focal length f=2.28 (mm), an overall aperture stop value (f-number) Fno=2.30, a half of the maximum view angle HFOV=41.0 (degrees), and the second lens element (320) with a refractive index $N_2$=1.543.

Table 5 shows the optical data of the optical lens assembly for image taking in accordance with this preferred embodiment, wherein the curvature radius of the object-side surface (321) of the second lens element (320) is $R_3$, the curvature radius of the image-side surface (322) of the second lens element (320) is $R_4$, and the curvature radius of the image-side surface (342) of the fourth lens element (340) is $R_8$, the focal length of the second lens element (320) is $f_2$, the focal length of the third lens element (330) is $f_3$, the focal length of the fourth lens element (340) is $f_4$, and the optical lens assembly satisfies the relations of $f/f_4$=0.50, $(R_3+R_4)/(R_3-R_4)$=−0.19, $R_8/f$=0.61 and $|f/f_2|+f/f_3$=2.03.

In this preferred embodiment, the optical lens assembly further comprises an aperture stop (300) disposed between the first lens element (310) and the second lens element (320), and the axial distance from the aperture stop (300) to the image plane (370) is SL, and the axial distance from the object-side surface (311) of the first lens element (310) to the image plane (370) is TTL, therefore satisfy the relation of SL/TTL=0.78. In this preferred embodiment, the focal length of the first lens element (310) is $f_1$, and the overall focal length of the optical lens assembly is f, so as to satisfy the relation of $f/f_1=-0.2$. The Abbe number of the fourth lens element (340) of the optical lens assembly is $v_4=56.5$, and the Abbe number of the third lens element (330) is $v_3=23.4$, as for satisfying the relation of $v_4-v_3=33.1$. The vertical distance from a light passed from a maximum-range position through the image-side surface (332) of the third lens element (330) to the optical axis is $Y_{32}$, and the distance from the position at the image-side surface (332) of the third lens element (330) at the position with a distance of $Y_{32}$ from the optical axis to a tangent plane at the tip of the optical axis of the third lens element is $SAG_{32}$, and satisfy the relation of $SAG_{32}/Y_{32}=0.18$.

From the optical data shown in FIG. 12 (which is Table 51) and the aberration curve as shown in FIG. 3B, the optical lens assembly for image taking in accordance with this preferred embodiment of the present invention achieves a good compensation effect on the longitudinal spherical aberration, astigmatic field curving and distortion.

Fourth Preferred Embodiment

Figure 4A:
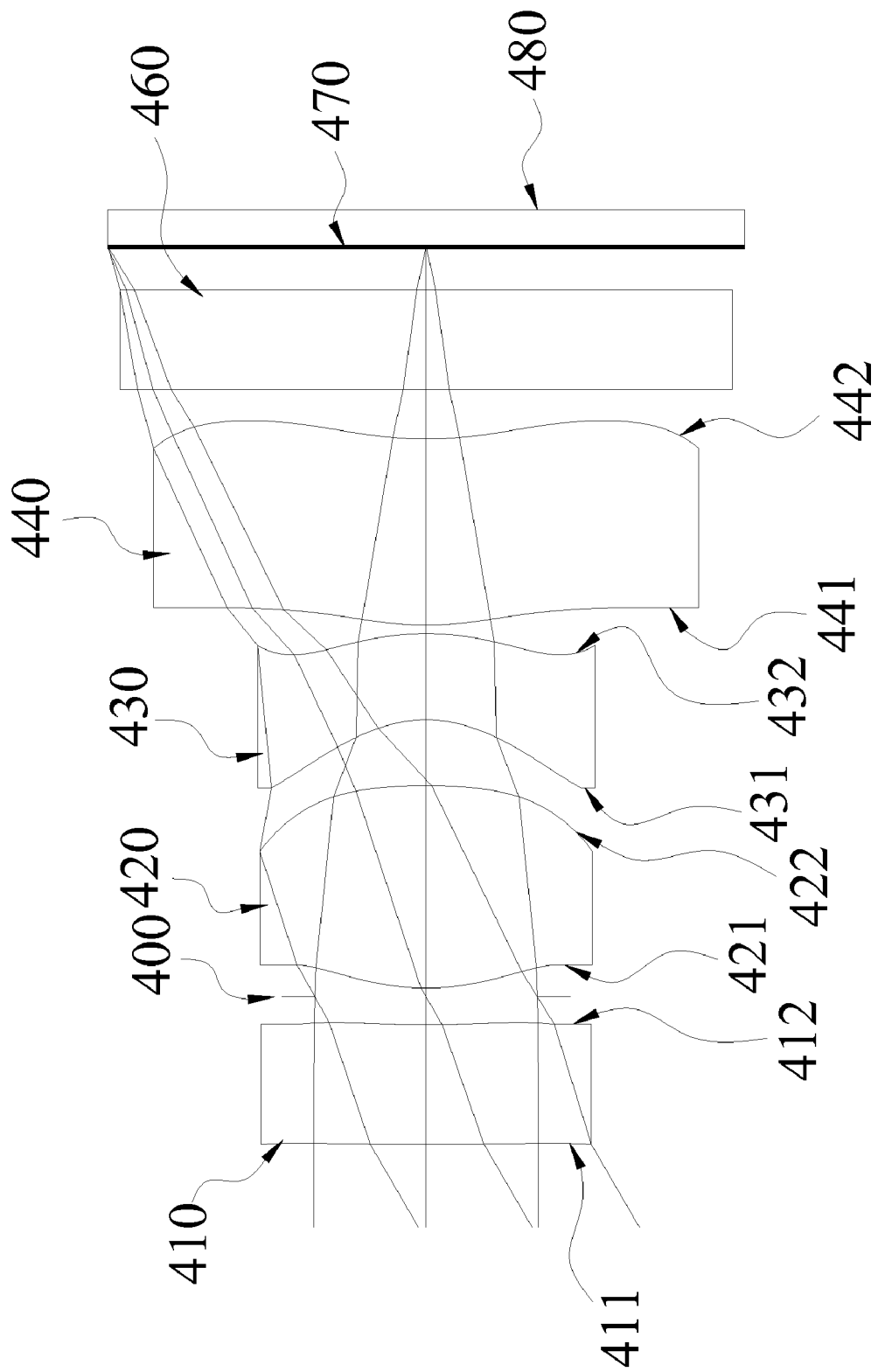
FIG. 4A is a schematic view of an optical lens assembly for image taking in accordance with the fourth preferred embodiment of the present invention.
Figure 4B:
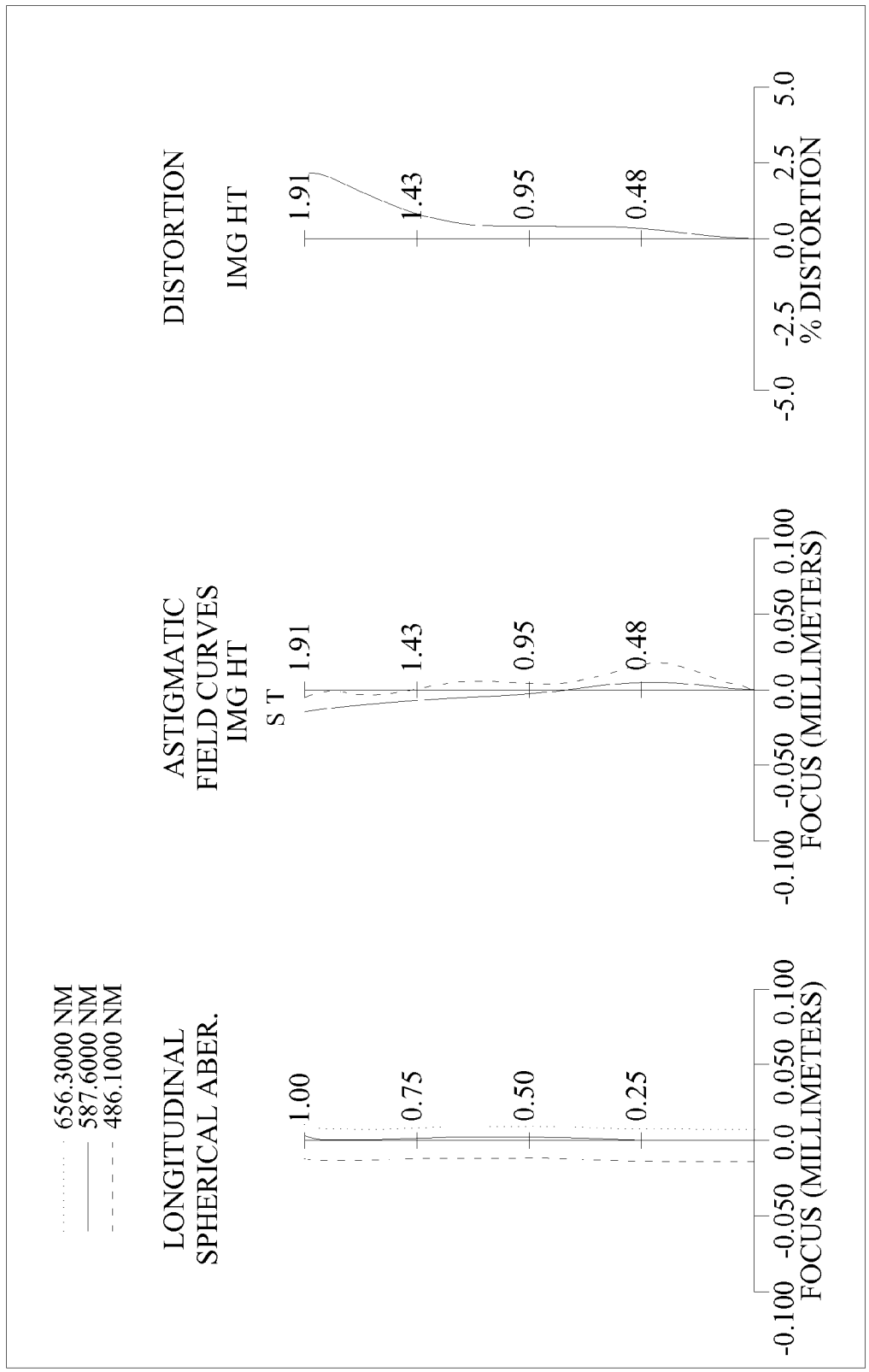
FIG. 4B is a series of aberration curves of the fourth preferred embodiment of the present invention.

With reference to FIGS. 4A and 4B for a schematic view and a series of aberration curves of an optical lens assembly for image taking in accordance with the fourth preferred embodiment of the present invention respectively, the optical lens assembly comprises four lenses, an infrared filter (460) and an image sensor (480), wherein the optical lens assembly sequentially from an object side to an image side along an optical axis comprises: the first lens element (410) with negative refractive power being made of a plastic material and having a convex object-side surface (411), and a concave image-side surface (412), and both object-side surface (411) and image-side surface (412) being aspheric; a bi-convex second lens element (420) with positive refractive power being made of a plastic material, and having both aspherical object-side surface (421) and image-side surface (422); the third lens element (430) with negative refractive power, being made of a plastic material and having a concave object-side surface (431) and a concave image-side surface (432), and both object-side surface (431) and image-side surface (432) being aspheric; the fourth lens element (440) with positive refractive power being made of a plastic material and having an inflection point, a convex object-side surface (441) and a concave image-side surface (442), and both object-side surface (441) and image-side surface (442) being aspheric; the infrared filter (IR-filter) (460) made of a glass material in form of a sheet glass which does not affect the focal length of the optical lens assembly; and the image sensor (480) installed on an image plane (470).

With reference to FIG. 14 (which is Table 7) for optical data of the fourth preferred embodiment, the object-side surface (411) and image-side surface (412) of the first lens element, the object-side surface (421) and image-side surface (422) of the second lens element, the object-side surface (431) and image-side surface (432) of the third lens element, and the object-side surface (441) and image-side surface (442) of the fourth lens element comply with an aspherical surface formula as shown in Equation (18), and the aspherical surface coefficients are listed in FIG. 15 (which is Table 8).

In the optical lens assembly for image taking in accordance with the fourth preferred embodiment, the optical lens assembly has an overall focal length f=3.23 (mm), an overall aperture stop value (f-number) Fno=2.40, a half of the maximum view angle HFOV=30.0 (degrees), and the second lens element (420) with a refractive index $N_2=1.544$.

Table 7 shows the optical data of the optical lens assembly for image taking in accordance with this preferred embodiment, wherein the curvature radius of the object-side surface (421) of the second lens element (420) is $R_3$, the curvature radius of the image-side surface (422) of the second lens element (420) is $R_4$, and the curvature radius of the image-side surface (442) of the fourth lens element (440) is $R_8$, the focal length of the second lens element (420) is $f_2$, the focal length of the third lens element (430) is $f_3$, the focal length of the fourth lens element (440) is $f_4$, and the optical lens assembly satisfies the relations of $f/f_4=0.44$, $(R_3+R_4)/(R_3-R_4)=-0.41$, $R_8/f=0.64$ and $f/f_2+f/f_3=2.77$.

In this preferred embodiment, the optical lens assembly further comprises an aperture stop (400) disposed between the first lens element (410) and the second lens element (420), and the axial distance from the aperture stop (400) to the image plane (470) is SL, and the axial distance from the object-side surface (411) of the first lens element (410) to the image plane (470) is TTL, therefore satisfy the relation of SL/TTL=0.83. In this preferred embodiment, the focal length of the first lens element (410) is $f_1$, and the overall focal length of the optical lens assembly is f, so as to satisfy the relation of $f/t=-0.27$. The Abbe number of the fourth lens element (440) of the optical lens assembly is $v_4=56.5$, and the Abbe number of the third lens element (430) is $v_3=25.6$, as for satisfying the relation of $v_4-v_3=30.9$. The vertical distance from a light passed from a maximum-range position through the image-side surface (432) of the third lens element (430) to the optical axis is $Y_{32}$, and the distance from the position at the image-side surface (432) of the third lens element (430) at the position with a distance of $Y_{32}$ from the optical axis to a tangent plane at the tip of the optical axis of the third lens element is $SAG_{32}$, and satisfy the relation of $SAG_{32}/Y_{32}=0.07$.

From the optical data shown in FIG. 14 (which is Table 7) and the image aberration curve as shown in FIG. 4B, the optical lens assembly for image taking in accordance with this preferred embodiment of the present invention achieves a good compensation effect on the longitudinal spherical aberration, astigmatic field curving and distortion.

Fifth Preferred Embodiment

Figure 5A:
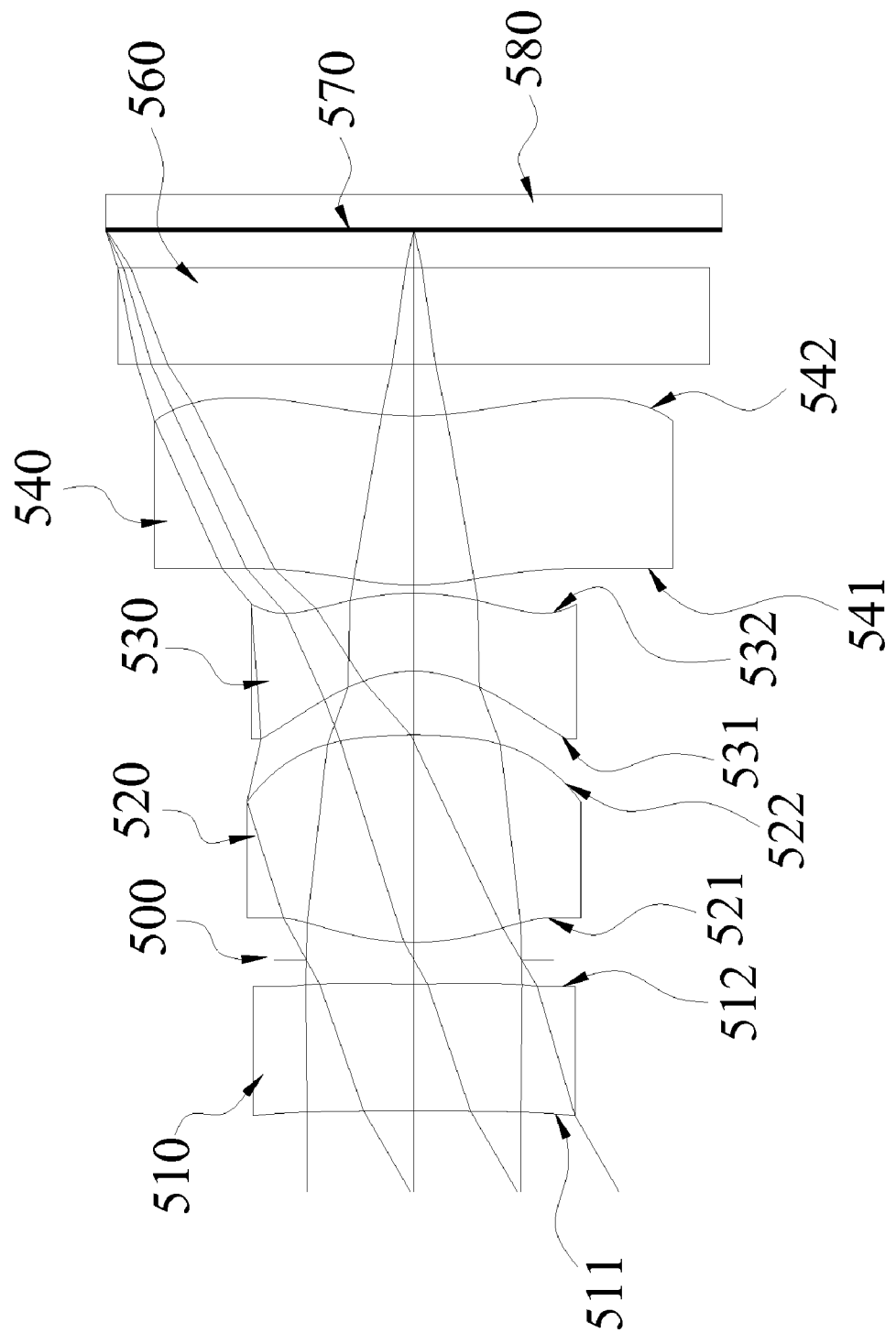
FIG. 5A is a schematic view of an optical lens assembly for image taking in accordance with the fifth preferred embodiment of the present invention.
Figure 5B:
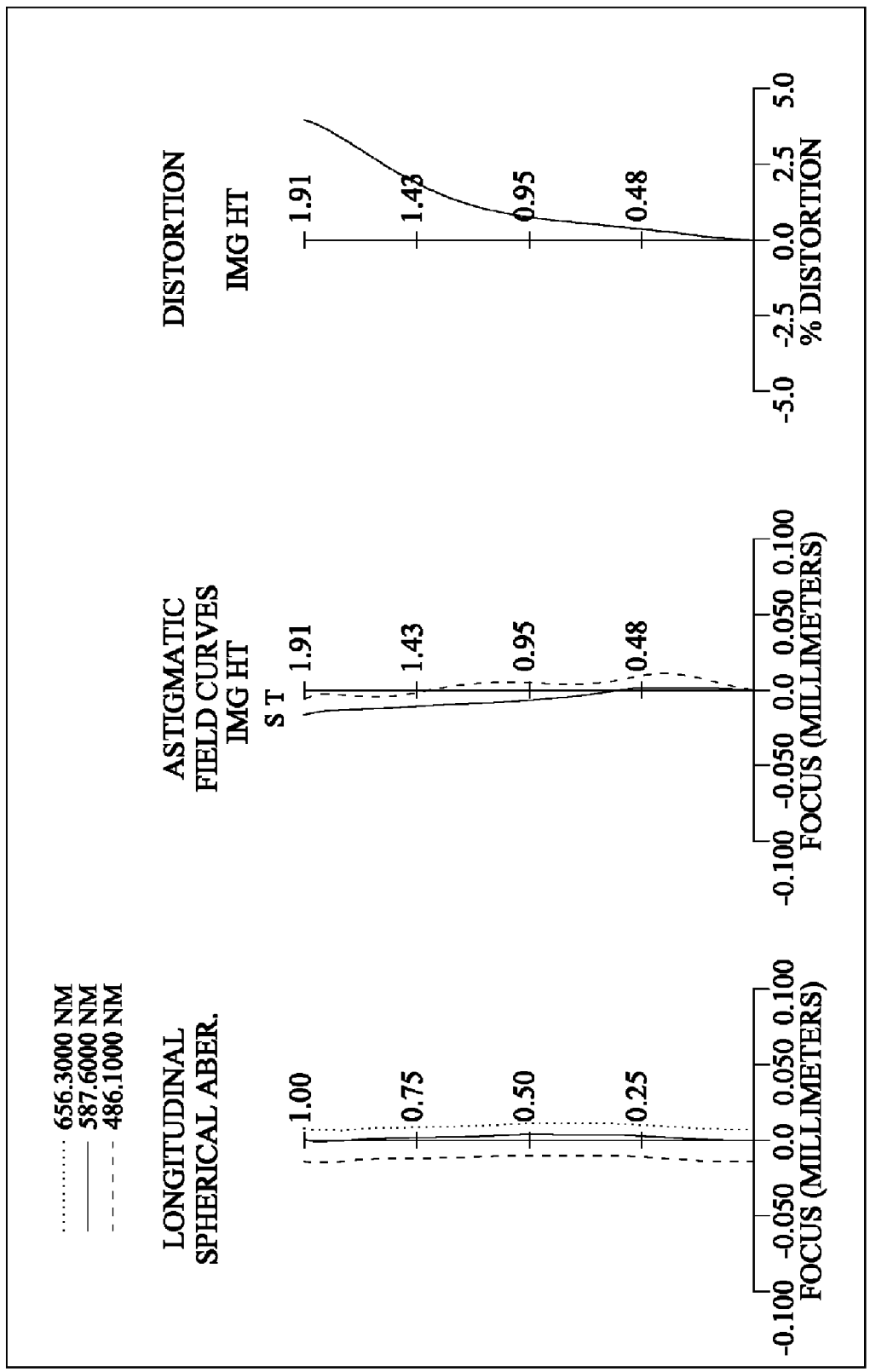
FIG. 5B is a series of aberration curves of the fifth preferred embodiment of the present invention.

With reference to FIGS. 5A and 5B for a schematic view and a series of aberration curves of an optical lens assembly for image taking in accordance with the fifth preferred embodiment of the present invention respectively, the optical lens assembly comprises four lenses, an infrared filter (560) and an image sensor (580), wherein the optical lens assembly sequentially from an object side to an image side along an optical axis comprises: the first lens element (510) with negative refractive power being made of a plastic material and having a concave object-side surface (511) and a concave image-side surface (512), and both object-side surface (511) and image-side surface (512) being aspheric; a bi-convex second lens element (520) with positive refractive power being made of a plastic material, and having both aspheric object-side surface (521) and image-side surface (522); the third lens element (530) with negative refractive power, being made of a plastic material and having a concave object-side surface (531) and a convex image-side surface (532), and both object-side surface (531) and image-side surface (532) being aspheric; the fourth lens element (540) with positive refractive power, being made of a plastic material and having an inflection point, a convex object-side surface (541) and a concave image-side surface (542), and both object-side surface (541) and image-side surface (542) being aspheric; the infrared filter (IR-filter) (560) made of a glass material in form of a sheet glass which does not affect the focal length of the optical lens assembly; and the image sensor (580) installed on an image plane (570).

With reference to FIG. 16 (which is Table 9) for optical data of the fifth preferred embodiment, the object-side surface (511) and image-side surface (512) of the first lens element, the object-side surface (521) and image-side surface (522) of the second lens element, the object-side surface (531) and image-side surface (532) of the third lens element, and the object-side surface (541) and image-side surface (542) of the fourth lens element comply with an aspherical surface formula as shown in Equation (18), and the aspherical surface coefficients are listed in FIG. 17 (which is Table 10).

In the optical lens assembly for image taking in accordance with the fifth preferred embodiment, the optical lens assembly has an overall focal length f=3.18 (mm), an overall aperture stop value (f-number) Fno=2.40, a half of the maximum view angle HFOV=30.0 (degrees), and the second lens element (520) with a refractive index $N_2$=1.544.

Table 9 shows the optical data of the optical lens assembly for image taking in accordance with this preferred embodiment, wherein the curvature radius of the object-side surface (521) of the second lens element (520) is $R_3$, the curvature radius of the image-side surface (522) of the second lens element (520) is $R_4$, and the curvature radius of the image-side surface (542) of the fourth lens element (540) is $R_8$, the focal length of the second lens element (520) is $f_2$, the focal length of the third lens element (530) is $f_3$, the focal length of the fourth lens element (540) is $f_4$, and the optical lens assembly satisfies the relations of $f/f_4$=0.52, $(R_3+R_4)/(R_3-R_4)$=−0.41, $R_8/f$=0.65 and $f/f_2+f/f_3$=2.70.

In this preferred embodiment, the optical lens assembly further comprises an aperture stop (500) disposed between the first lens element (510) and the second lens element (520), and the axial distance from the aperture stop (500) to the image plane (570) is SL, and the axial distance from the object-side surface (511) of the first lens element (510) to the image plane (570) is TTL, therefore satisfy the relation of SL/TTL=0.82. In this preferred embodiment, the focal length of the first lens element (510) is $f_1$, and the overall focal length of the optical lens assembly is f, so as to satisfy the relation of $f/f_1$=−0.17. The Abbe number of the fourth lens element (540) of the optical lens assembly is $v_4$=56.5, and the Abbe number of the third lens element (530) is $v_3$=25.6, as for satisfying the relation of $v_4-v_3$=30.9. The vertical distance from a light passed from a maximum-range position through the image-side surface (532) of the third lens element (530) to the optical axis is $Y_{32}$, and the distance from the position at the image-side surface (532) of the third lens element (530) at the position with a distance of $Y_{32}$ from the optical axis to a tangent plane at the tip of the optical axis of the third lens element is $SAG_{32}$, and satisfy the relation of $SAG_{32}/Y_{32}$=0.06.

From the optical data shown in FIG. 16 (which is Table 9) and the image aberration curve as shown in FIG. 5B, the optical lens assembly for image taking in accordance with this preferred embodiment of the present invention achieves a good compensation effect on the longitudinal spherical aberration, astigmatic field curving and distortion.

Sixth Preferred Embodiment

Figure 6A:
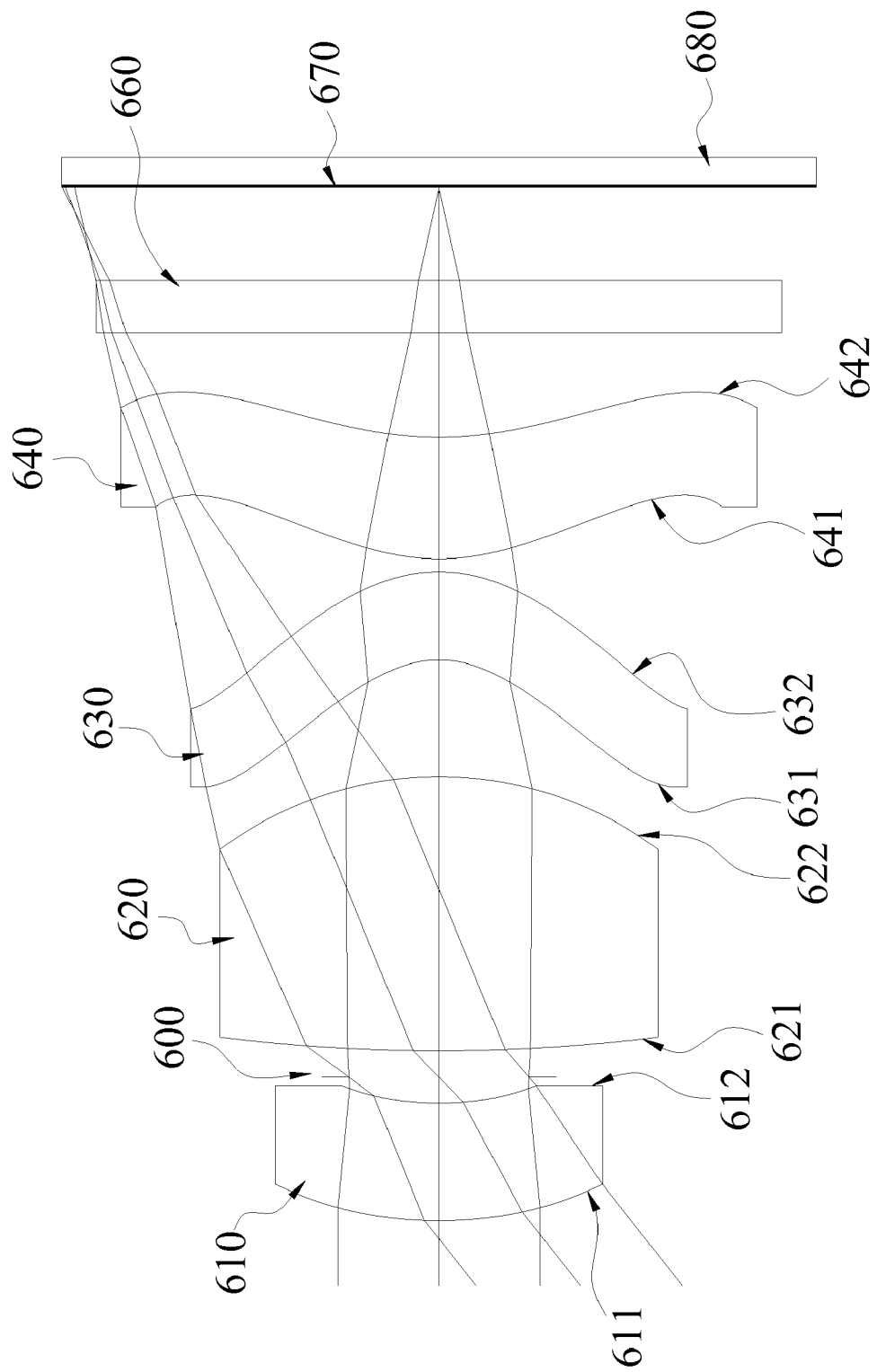
FIG. 6A is a schematic view of an optical lens assembly for image taking in accordance with the sixth preferred embodiment of the present invention.
Figure 6B:
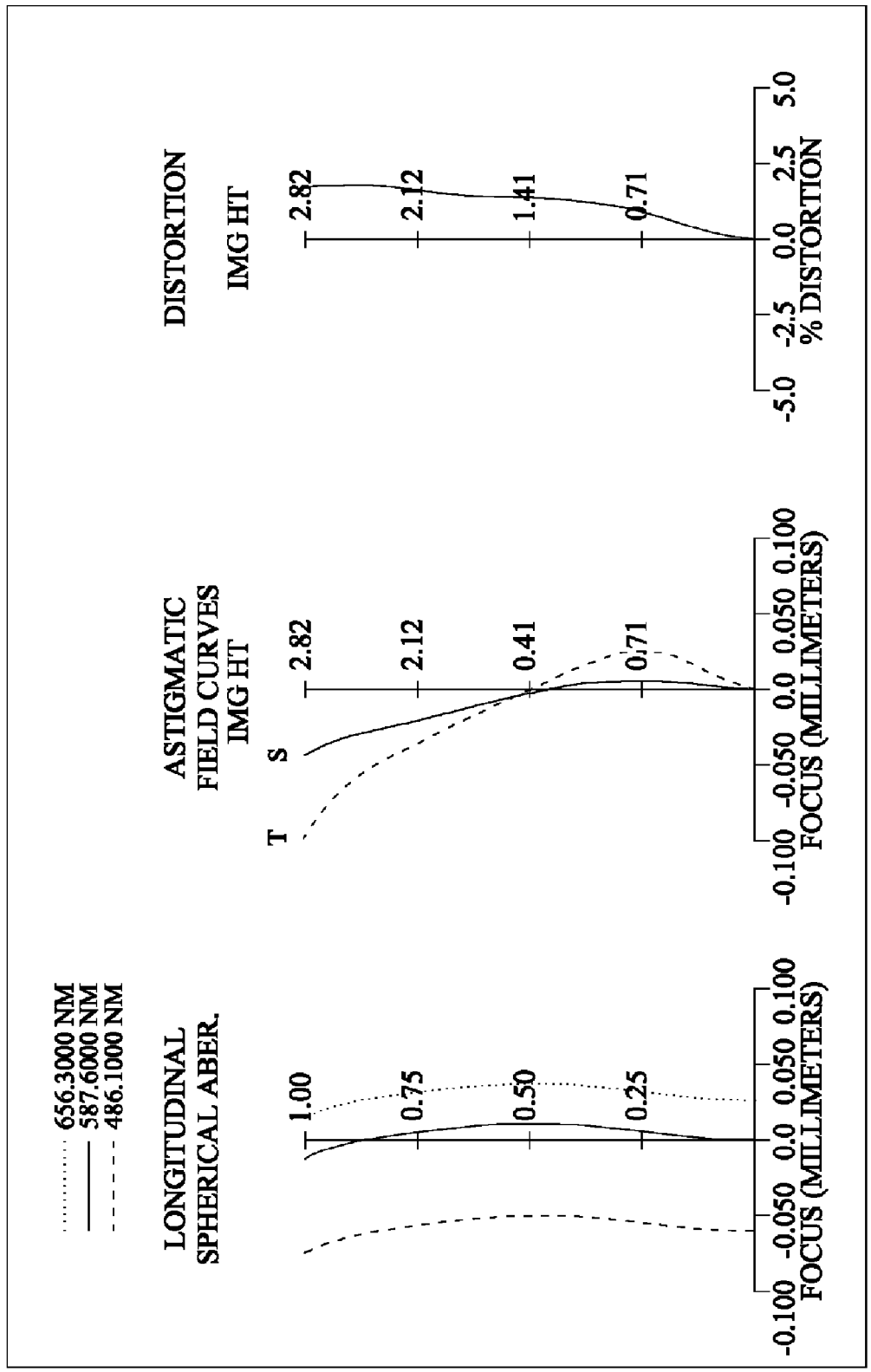
FIG. 6B is a series of aberration curves of the sixth preferred embodiment of the present invention.

With reference to FIGS. 6A and 6B for a schematic view and a series of aberration curves of an optical lens assembly for image taking in accordance with the sixth preferred embodiment of the present invention respectively, the optical lens assembly is a high-resolution optical lens assembly primarily comprising four lenses, an infrared filter (660) and an image sensor (680), wherein the optical lens assembly sequentially from an object side to an image side along an optical axis comprises: the first lens element (610) with negative refractive power, being made of a plastic material and having a convex object-side surface (611) and a concave image-side surface (612), and both object-side surface (611) and image-side surface (612) being aspheric; a bi-convex second lens element (620) with positive refractive power being made of a glass material, and having both aspheric object-side surface (621) and image-side surface (622); the third lens element (630) with negative refractive power, being made of a plastic material and having a concave object-side surface (631) and a convex image-side surface (632), and both object-side surface (631) and image-side surface (632) being aspheric; the fourth lens element (640) with positive refractive power, being made of a plastic material and having an inflection point, a concave object-side surface (641) and a concave image-side surface (642), and both object-side surface (641) and image-side surface (642) being aspheric; the infrared filter (IR-filter) (660) made of a glass material in form of a sheet glass which does not affect the focal length of the optical lens assembly; and the image sensor (680) installed on an image plane (670).

With reference to FIG. 18 (which is Table 11) for optical data of the sixth preferred embodiment, the object-side surface (611) and image-side surface (612) of the first lens element, the object-side surface (621) and image-side surface (622) of the second lens element, the object-side surface (631) and image-side surface (632) of the third lens element, and the object-side surface (641) and image-side surface (642) of the fourth lens element comply with an aspherical surface formula as shown in Equation (18), and the aspherical surface coefficients are listed in FIG. 19 (which is Table 12).

In the optical lens assembly for image taking in accordance with the sixth preferred embodiment, the optical lens assembly has an overall focal length f=3.56 (mm), an overall aperture stop value (f-number) Fno=2.30, a half of the maximum view angle HFOV=38.2 (degrees), and the second lens element (620) with a refractive index $N_2$=1.801.

Table 10 shows the optical data of the optical lens assembly for image taking in accordance with this preferred embodiment, wherein the curvature radius of the object-side surface (621) of the second lens element (620) is $R_3$, the curvature radius of the image-side surface (622) of the second lens element (620) is $R_4$, and the curvature radius of the image-side surface (642) of the fourth lens element (640) is $R_8$, the focal length of the second lens element (620) is $f_2$, the focal length of the third lens element (630) is $f_3$, the focal length of the fourth lens element (640) is $f_4$, and the optical lens assembly satisfies the relations of $f/f_4$=0.54, $(R_3+R_4)/(R_3-R_4)$=0.66, $R_8/f$=0.76 and $f/f_2+f/f_3$=1.50.

In this preferred embodiment, the optical lens assembly further comprises an aperture stop (600) disposed between the first lens element (610) and the second lens element (620), and the axial distance from the aperture stop (600) to the image plane (670) is SL, and the axial distance from the object-side surface (611) of the first lens element (610) to the image plane (670) is TTL, therefore satisfy the relation of SL/TTL=0.86. In this preferred embodiment, the focal length of the first lens element (610) is $f_1$, and the overall focal length of the optical lens assembly is f, so as to satisfy the relation of f/t=−0.14. The Abbe number of the fourth lens element (640) of the optical lens assembly is $v_4$=55.8, and the Abbe number of the third lens element (630) is $v_3$=30.2, as for satisfying the relation of $v_4-v_3$=25.36. The vertical distance from a light passed from a maximum-range position through the image-side surface (632) of the third lens element (630) to the optical axis is $Y_{32}$, and the distance from the position at the image-side surface (632) of the third lens element (630) at the position with a distance of $Y_{32}$ from the optical axis to a tangent plane at the tip of the optical axis of the third lens element is $SAG_{32}$, and satisfy the relation of $SAG_{32}/Y_{32}=0.55$.

From the optical data shown in FIG. 18 (which is Table 11) and the image aberration curve as shown in FIG. 6B, the optical lens assembly for image taking in accordance with this preferred embodiment of the present invention achieves a good compensation effect on the longitudinal spherical aberration, astigmatic field curving and distortion.

Seventh Preferred Embodiment

Figure 7B:
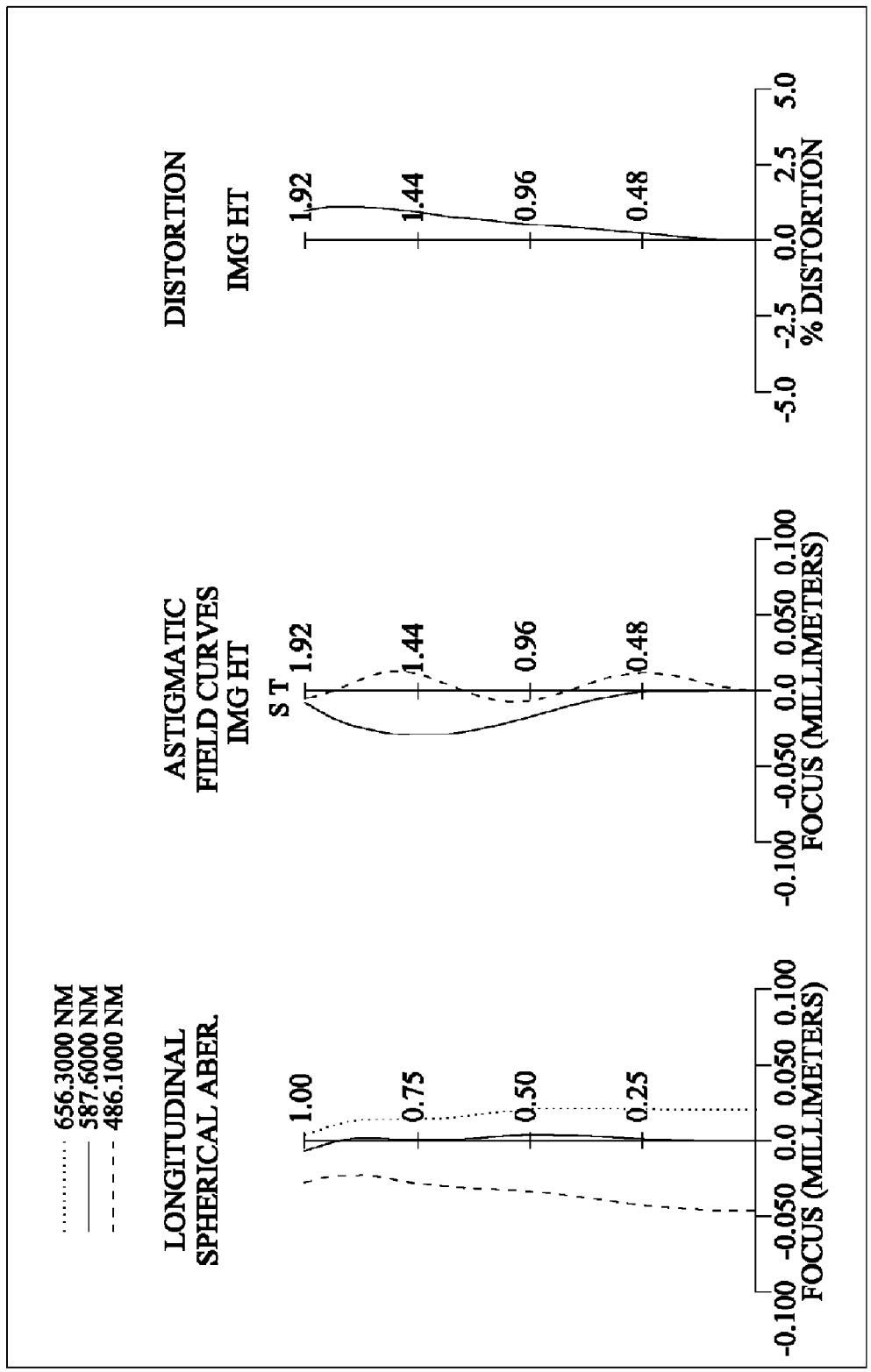
FIG. 7B is a series of aberration curves of the seventh preferred embodiment of the present invention.

With reference to FIGS. 7A and 7B for a schematic view and a series of aberration curves of an optical lens assembly for image taking in accordance with the seventh preferred embodiment of the present invention respectively, the optical lens assembly is an optical lens assembly with a shorter total length and a better aberration correction capability, and the optical lens assembly primarily comprises four lenses, an infrared filter (760), a cover-glass (790) and an image sensor (780), wherein the optical lens assembly sequentially from an object side to an image side along an optical axis comprises: the first lens element (710) with positive refractive power, being made of a plastic material and having a convex object-side surface (711) and a concave image-side surface (712), and both object-side surface (711) and image-side surface (712) being aspheric; a bi-convex second lens element (720) with positive refractive power being made of a glass material, and having both aspheric object-side surface (721) and image-side surface (722); the third lens element (730) with negative refractive power, being made of a plastic material and having a concave object-side surface (731), and a convex image-side surface (732), and both object-side surface (731) and image-side surface (732) being aspheric; the fourth lens element (740) with positive refractive power, being made of a plastic material and having an inflection point, a convex object-side surface (741) and a concave image-side surface (742), and both object-side surface (741) and image-side surface (742) being aspheric; the infrared filter (IR-filter) (760) made of a glass material in form of a sheet glass which does not affect the focal length of the optical lens assembly; the cover-glass (790) in a sheet glass form is installed between the infrared filter (760) and the image plane (770) which does not affect the focal length of the optical lens assembly of the present invention; and the image sensor (780) is installed on an image plane (770).

With reference to FIG. 20 (which is Table 13) for optical data of the seventh preferred embodiment, the object-side surface (711) and image-side surface (712) of the first lens element, the object-side surface (721) and image-side surface (722) of the second lens element, the object-side surface (731) and image-side surface (732) of the third lens element, and the object-side surface (741) and image-side surface (742) of the fourth lens element comply with an aspherical surface formula as shown in Equation (18), and the aspherical surface coefficients are listed in FIG. 21 (which is Table 14).

In the optical lens assembly for image taking in accordance with the seventh preferred embodiment, the optical lens assembly has an overall focal length f=3.43 (mm), an overall aperture stop value (f-number) Fno=2.30, a half of the maximum view angle HFOV=29.0 (degrees), and the second lens element (720) with a refractive index $N_2$=1.728.

Table 13 shows the optical data of the optical lens assembly for image taking in accordance with this preferred embodiment, wherein the curvature radius of the object-side surface (721) of the second lens element (720) is $R_3$, the curvature radius of the image-side surface (722) of the second lens element (720) is $R_4$, and the curvature radius of the image-side surface (742) of the fourth lens element (740) is $R_8$, the focal length of the second lens element (720) is $f_2$, the focal length of the third lens element (730) is $f_3$, the focal length of the fourth lens element (740) is $f_4$, and the optical lens assembly satisfies the relations of $f/f_4=0.41$, $(R_3+R_4)/(R_3-R_4)=-0.35$, $R_8/f=0.72$ and $f/f_2+f/f_3=2.22$.

In this preferred embodiment, the optical lens assembly further comprises an aperture stop (700) disposed between the first lens element (710) and the second lens element (720), and the axial distance from the aperture stop (700) to the image plane (770) is SL, and the axial distance from the object-side surface (711) of the first lens element (710) to the image plane (770) is TTL, therefore satisfy the relation of SL/TTL=0.87. In this preferred embodiment, the focal length of the first lens element (710) is $f_1$, and the overall focal length of the optical lens assembly is f, so as to satisfy the relation of f/t=0.30. The Abbe number of the fourth lens element (740) of the optical lens assembly is $v_4$=56.5, and the Abbe number of the third lens element (730) is $v_3$=23.4, as for satisfying the relation of $v_4-v_3$=33.1. The vertical distance from a light passed from a maximum-range position through the image-side surface (732) of the third lens element (730) to the optical axis is $Y_{32}$, and the distance from the position at the image-side surface (732) of the third lens element (730) at the position with a distance of $Y_{32}$ from the optical axis to a tangent plane at the tip of the optical axis of the third lens element is $SAG_{32}$, and satisfy the relation of $SAG_{32}/Y_{32}=0.01$.

From the optical data shown in FIG. 20 (which is Table 13) and the image aberration curve as shown in FIG. 7B, the optical lens assembly for image taking in accordance with this preferred embodiment of the present invention achieves a good compensation effect on the longitudinal spherical aberration, astigmatic field curving and distortion.

In the optical lens assembly for image taking in accordance with the present invention, the lenses can be made of glass or plastic. If the lenses are made of glass, the configuration flexibility of refractive powers of the optical lens assembly for image taking can be increased. If the lenses are made of plastic, the production cost can be lowered effectively. In addition, the optical lens surfaces can be aspherical surfaces to allow a simpler lens manufacturing with non-spherical shapes and provide more control variables for eliminating the image aberration, so as to reduce the number of lenses used and shorten the total length of the optical lens assembly for image taking in accordance with the present invention effectively.

In the optical lens assembly for image taking in accordance with the present invention, if a lens surface is convex, it shows that the lens surface in proximity to the optical axis is convex; if a lens surface is concave, it shows that the lens surface in proximity to the optical axis is concave.

In the optical lens assembly for image taking in accordance with the present invention can have at least one stop (not shown in the figure) to reduce stray lights while improving the image quality.

Tables 1 to 14 (corresponding to FIGS. 8 to 21 respectively) show values of the optical lens assembly for image taking of preferred embodiments of the present invention. While the invention has been described by means of specific embodiments, numerous modifications and variations could be made thereto by those skilled in the art without departing from the scope and spirit of the invention set forth in the claims.

What is claimed is:

1. An optical lens assembly for image taking, sequentially from an object side to an image side along an optical axis, comprising:
a first lens element with refractive power;
a second lens element with positive refractive power, being bi-convex;
a third lens element with negative refractive power, having a concave object-side surface and a convex image-side surface, and at least one of the object-side and image-side surfaces of the third lens element being aspheric; and
a fourth lens element with positive refractive power, having a convex object-side surface and a concave image-side surface, and at least one of the object-side surface and the image-side surface having at least one inflection point;
wherein f is a focal length of the optical lens assembly for image taking, $f_2$ is a focal length of the second lens element, $f_3$ is a focal length of the third lens element, $f_4$ is a focal length of the fourth lens element, $R_3$ is a curvature radius of the object-side surface of the second lens element, $R_4$ is a curvature radius of the image-side surface of the second lens element, and $R_8$ is a curvature radius of the image-side surface of the fourth lens element; and the following conditions are satisfied:

$0 < f/f_4 < 0.75;$ $-1.0 < (R_3+R_4)/(R_3-R_4) < 0.8;$ $0 < R_8/f < 1.0;$ $1.2 < |f/f_2| + |f/f_3| < 3.1.$

2. The optical lens assembly for image taking as recited in claim 1, wherein both object-side and image-side surfaces of the third lens element are aspheric, and both object-side and image-side surfaces of the fourth lens element are aspheric and the fourth lens element is made of plastic.

3. The optical lens assembly for image taking as recited in claim 2, further comprising a stop, wherein SL is an axial distance from the stop to an image plane of the optical lens assembly for image taking, and TTL is an axial distance from the object-side surface of the first lens element to the image plane, and the following condition is satisfied:

$0.65 < SL/TTL < 0.92.$

4. The optical lens assembly for image taking as recited in claim 3, wherein $R_3$ is the curvature radius of the object-side surface of the second lens element, $R_4$ is the curvature radius of the image-side surface of the second lens element, and preferably the following condition is satisfied:

$-1.0 < (R_3+R_4)/(R_3-R_4) < 0.0.$

5. The optical lens assembly for image taking as recited in claim 4, wherein $v_3$ is an Abbe number of the third lens element, $v_4$ is an Abbe number of the fourth lens element, and the following condition is satisfied:

$20 < v_4 - v_3 < 40.$

6. The optical lens assembly for image taking as recited in claim 4, wherein $Y_{32}$ is a vertical distance from a maximum-range position for a passage of light on the image-side surface of the third lens element to the optical axis, $SAG_{32}$ is a distance between a position $Y_{32}$ away from the optical axis on the image-side surface of the third lens element and a tangent plane through the tip of the image-side surface of the third lens element near the optical axis, and the following condition is satisfied:

$0 < SAG_{32}/Y_{32} < 0.25.$

7. The optical lens assembly for image taking as recited in claim 3, wherein f is the focal length of the optical lens assembly for image taking, $f_1$ is the focal length of the first lens element, and the following condition is satisfied:

$-0.6 < f/f_1 < 0.6.$

8. The optical lens assembly for image taking as recited in claim 7, wherein the second lens element is made of glass.

9. The optical lens assembly for image taking as recited in claim 8, wherein $N_2$ is a refractive index of the second lens element, and satisfies the following condition:

$N_2 > 1.7.$

10. The optical lens assembly for image taking as recited in claim 7, wherein $R_3$ is the curvature radius of the object-side surface of the second lens element, $R_4$ is the curvature radius of the image-side surface of the second lens element, and preferably the following condition is satisfied:

$-0.5 < (R_3+R_4)/(R_3-R_4) < -0.1.$

11. The optical lens assembly for image taking as recited in claim 7, wherein f is the focal length of the optical lens assembly for image taking, $f_2$ is the focal length of the second lens element, $f_3$ is the focal length of the third lens element, and preferably the following condition is satisfied:

$1.7 < f/f_2 + f/f_3 < 2.8.$

12. The optical lens assembly for image taking as recited in claim 7, wherein f is the focal length of the optical lens assembly for image taking, $f_1$ is the focal length of the first lens element, and the following condition is satisfied:

$-0.3 < f/f_1 < 0.3.$

13. The optical lens assembly for image taking as recited in claim 3, wherein $R_3$ is the curvature radius of the object-side surface of the second lens element, $R_4$ is the curvature radius of the image-side surface of the second lens element, and preferably the following condition is satisfied:

$-0.5 < (R_3+R_4)/(R_3-R_4) < -0.1.$

14. An optical lens assembly for image taking, sequentially from an object side to an image side along an optical axis comprising:
a first lens element, with refractive power;
a second lens element, with positive refractive power being bi-convex;
a third lens element, with negative refractive power, having a concave object-side surface and a convex image-side surface, and both object-side and image-side surfaces of the third lens element being aspheric; and
a fourth lens element, with positive refractive power, having a convex object-side surface and a concave image-side surface, and both object-side and image-side surfaces of the fourth lens element being aspheric;
wherein f is a focal length of the optical lens assembly for image taking, $f_1$ is a focal length of the first lens element, $f_4$ is a focal length of the fourth lens element, $R_3$ is a curvature radius of the object-side surface of the second lens element, $R_4$ is a curvature radius of the image-side surface of the second lens element, and $R_8$ is a curvature radius of the image-side surface of the fourth lens element; and the following conditions are satisfied:

$0 < f/f_4 < 0.75;$ $-1.0 < (R_3+R_4)/(R_3-R_4) < 0.0;$ $0 < R_8/f < 5.0;$ $-0.6 < f/f_1 < 0.6.$

15. The optical lens assembly for image taking as recited in claim 14, wherein the third lens element and the fourth lens element are made of plastic, and f is the focal length of the optical lens assembly for image taking, $R_8$ is the curvature radius of the image-side surface of the fourth lens element, and preferably the following condition of is satisfied:

$0 < R_8/f < 2.0.$

16. The optical lens assembly for image taking as recited in claim 15, wherein $v_3$ is an Abbe number of the third lens element, $v_4$ is an Abbe number of the fourth lens element, and the following condition is satisfied:

$20 < v_4 - v_3 < 40.$

17. The optical lens assembly for image taking as recited in claim 16, wherein f is the focal length of the optical lens assembly for image taking, $f_2$ is the focal length of the second lens element, $f_3$ is the focal length of the third lens element, and the following condition is satisfied:

$1.2 < f/f_2 + f/f_3 < 3.1.$

18. The optical lens assembly for image taking as recited in claim 17, wherein f is the focal length of the optical lens assembly for image taking, $f_4$ is the focal length of the fourth lens element, and preferably the following condition is satisfied:

$0 < f/f_4 < 0.55.$

19. The optical lens assembly for image taking as recited in claim 17, wherein f is the focal length of the optical lens assembly for image taking, $R_8$ is the curvature radius of the image-side surface of the fourth lens element, and preferably the following condition is satisfied:

$0 < R_8/f < 1.0.$

20. The optical lens assembly for image taking as recited in claim 17, wherein the second lens element is made of glass.

21. The optical lens assembly for image taking as recited in claim 17, wherein $N_2$ is a refractive index of the second lens element, and satisfies the following condition:

$N_2 > 1.7.$

22. The optical lens assembly for image taking as recited in claim 17, wherein $Y_{32}$ is a vertical distance from a maximum-range position for a passage of light on the image-side surface of the third lens element to the optical axis, $SAG_{32}$ is a distance between a position $Y_{32}$ away from the optical axis on the image-side surface of the third lens element and a tangent plane through the tip of the image-side surface of the third lens element near the optical axis, and the following condition is satisfied:

$0 < SAG_{32}/Y_{32} < 0.25.$

23. The optical lens assembly for image taking as recited in claim 17, wherein f is the focal length of the optical lens assembly for image taking, $f_1$ is the focal length of the first lens element, and preferably the following condition is satisfied:

$-0.3 < f/f_1 < 0.3.$

* * * * *

UNITED STATES PATENT AND TRADEMARK OFFICE
CERTIFICATE OF CORRECTION

PATENT NO.         : 8,189,272 B1
APPLICATION NO.    : 13/182932
DATED              : May 29, 2012
INVENTOR(S)        : Hsin-Hsuan Huang and Tsung-Han Tsai It is certified that error appears in the above-identified patent and that said Letters Patent is hereby corrected as shown below:

In column 3, line 15, change equation (8) "20 v4 - v3 < 40" to read as "20 < v4 – v3 < 40"
In column 12, line 59, change equation "|f/f2 + f/f3 = 2.03" to read as "| f/f2 |+ | f/f3 | = 2.03"
In column 14, line 10, change equation "f/f2 + f/f3 = 2.77" to read as "| f/f2 |+ | f/f3 |= 2.77"
In column 14, line 22, change equation "f/t = -0.27" to read as "f/f1 = -0.27"
In column 15, line 30, change equation "f/f2 + f/f3 = 2.70" to read as "| f/f2 |+ | f/f3 | = 2.70"
In column 16, line 50, change equation "f/f2 + f/f3 =1.50" to read as "| f/f2 |+ | f/f3 | = 1.50"
In column 16, line 61, change equation "f/t = -0.14" to read as "f/f1 = -0.14"
In column 18, line 8, change equation "f/f2 + f/f3 = 2.22" to read as "| f/f2 | + | f/f3 | = 2.22"
In column 18, line 20, change equation "f/t = 0.30" to read as "f/f1 = 0.30"

Signed and Sealed this
Twenty-eighth Day of August, 2012

David J. Kappos
*Director of the United States Patent and Trademark Office*